US010466749B1

(12) United States Patent
Hendren et al.

(10) Patent No.: US 10,466,749 B1
(45) Date of Patent: Nov. 5, 2019

(54) PERIPHERAL HOUSING FOR A COMPUTING DEVICE

(71) Applicant: Apple Inc., Cupertino, CA (US)

(72) Inventors: Keith J. Hendren, San Francisco, CA (US); Adam T. Garelli, Morgan Hill, CA (US); Bryan W. Posner, San Francisco, CA (US); Denis H. Endisch, Cupertino, CA (US); Dinesh C. Mathew, San Francisco, CA (US); Paul X. Wang, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/261,523

(22) Filed: Jan. 29, 2019

Related U.S. Application Data

(60) Provisional application No. 62/737,080, filed on Sep. 26, 2018.

(51) Int. Cl.
*G06F 1/16* (2006.01)

(52) U.S. Cl.
CPC .......... *G06F 1/1656* (2013.01); *G06F 1/1616* (2013.01); *G06F 1/1635* (2013.01); *G06F 1/1637* (2013.01); *G06F 1/1669* (2013.01)

(58) Field of Classification Search
CPC combination set(s) only.
See application file for complete search history.

(56) References Cited

U.S. PATENT DOCUMENTS

| 5,100,098 A | * | 3/1992 | Hawkins | F16M 11/041 16/339 |
| 5,224,060 A | * | 6/1993 | Ma | G06F 1/162 361/679.09 |
| 5,229,757 A | * | 7/1993 | Takamiya | F16M 11/10 235/145 R |
| 5,235,495 A | * | 8/1993 | Blair | F16M 11/10 16/445 |
| 5,247,285 A | * | 9/1993 | Yokota | E05C 1/10 248/919 |
| 5,268,817 A | * | 12/1993 | Miyagawa | G06F 1/1618 361/679.06 |
| 5,276,589 A | * | 1/1994 | Bartlett | G06F 1/162 248/920 |
| 5,293,300 A | * | 3/1994 | Leung | G06F 1/1616 361/679.59 |
| 5,375,076 A | * | 12/1994 | Goodrich | G06F 1/1626 361/679.17 |
| 6,005,767 A | * | 12/1999 | Ku | G06F 1/162 345/169 |
| 6,636,420 B2 | * | 10/2003 | Nakano | G06F 1/1616 248/917 |

(Continued)

Primary Examiner — Lisa Lea-Edmonds
(74) Attorney, Agent, or Firm — Dorsey & Whitney LLP

(57) ABSTRACT

A computing device can include a housing including a peripheral housing defining an aperture, the peripheral housing having a constant cross-sectional area. The computing device can also include a display having a first major surface and a second major surface opposing the first major surface, the display disposed within the aperture defined by the peripheral housing and attached to the housing at one or more locations such that the first major surface and the second major surface of the display are substantially unobstructed by any other portion of the computing device.

19 Claims, 18 Drawing Sheets

(56) References Cited

U.S. PATENT DOCUMENTS

| | | | | |
|---|---|---|---|---|
| 6,665,175 B1* | 12/2003 | deBoer | | G06F 1/162 248/920 |
| 6,700,773 B1* | 3/2004 | Adriaansen | | G06F 1/1618 345/156 |
| 7,106,578 B2* | 9/2006 | Chen | | G06F 1/1601 248/917 |
| 7,283,355 B2* | 10/2007 | Han | | G06F 1/162 248/917 |
| 7,391,606 B2* | 6/2008 | Chen | | F16M 11/126 248/917 |
| 7,436,655 B2* | 10/2008 | Homer | | G06F 1/162 248/917 |
| 7,787,242 B2* | 8/2010 | Schwager | | G06F 1/162 361/679.06 |
| 7,869,200 B2* | 1/2011 | Horie | | G06F 1/16 361/679.02 |
| 7,898,796 B2* | 3/2011 | Horie | | G06F 1/16 361/679.02 |
| 8,081,429 B2* | 12/2011 | Horie | | G06F 1/16 361/679.01 |
| 8,259,437 B2* | 9/2012 | Vesely | | B60N 3/004 345/156 |
| 8,302,488 B2* | 11/2012 | Hsu | | G01M 99/005 361/679.27 |
| 8,514,567 B2* | 8/2013 | Shin | | A61B 8/4427 361/679.01 |
| 8,576,563 B2* | 11/2013 | Yang | | A63H 33/006 206/701 |
| 2005/0063145 A1* | 3/2005 | Homer | | G06F 1/162 361/679.27 |
| 2005/0105264 A1* | 5/2005 | Chen | | G06F 1/1616 361/679.27 |
| 2006/0050471 A1* | 3/2006 | Chen | | G06F 1/1601 361/679.22 |
| 2006/0050472 A1* | 3/2006 | Chen | | G06F 1/1601 361/679.22 |
| 2006/0077623 A1* | 4/2006 | Yeh | | G06F 1/1601 361/679.22 |
| 2006/0256512 A1* | 11/2006 | Esther Kang | | G06F 1/162 361/679.05 |
| 2007/0008685 A1* | 1/2007 | Hsiung | | G11B 33/025 361/679.27 |
| 2007/0159781 A1* | 7/2007 | Zbikowski | | A45C 13/02 361/679.27 |
| 2009/0296335 A1* | 12/2009 | Cheng | | G06F 1/1616 361/679.27 |
| 2010/0124009 A1* | 5/2010 | Jiang | | G06F 1/162 361/679.27 |
| 2010/0220441 A1* | 9/2010 | Berlekamp | | G06F 1/1656 361/679.54 |
| 2017/0152990 A1* | 6/2017 | Kielland | | A45F 5/00 |

* cited by examiner

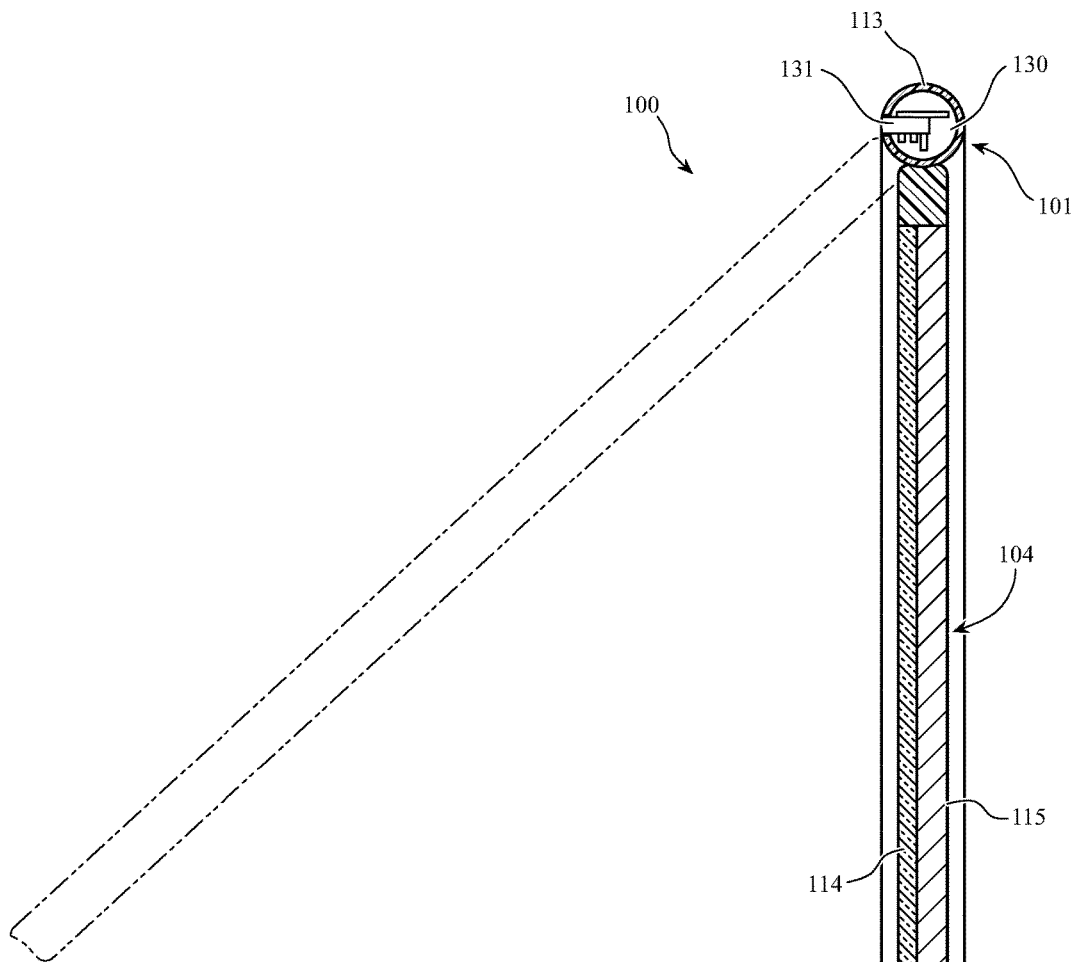
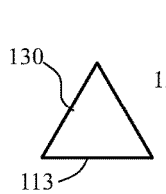 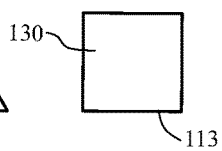 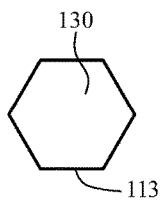 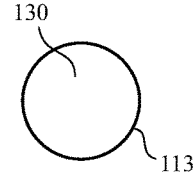
FIG. 4A
FIG. 4B  FIG. 4C  FIG. 4D  FIG. 4E

PERIPHERAL HOUSING FOR A COMPUTING DEVICE

CROSS-REFERENCE TO RELATED APPLICATION(S)

This claims priority to U.S. Provisional Patent Application No. 62/737,080, filed 26 Sep. 2018, and entitled "RING MAC CONCEPT," the entire disclosure of which is hereby incorporated by reference.

FIELD

The described embodiments relate generally to computing devices. More particularly, the present embodiments relate to computing devices including a housing and a display.

BACKGROUND

The components of computing devices, including housings for computing devices, can be designed or formed for specific purposes. Large or bulky components have traditionally been needed to achieve a desired level of performance in a computing device, such as a desired amount of memory or a desired level of computing power. Housings for such computing devices were thus constrained to designs including relatively large or uninterrupted internal volumes. Other performance requirements for the computing devices may also limit the housings to certain form factors. Further, for a computing device including a display, the configuration or orientation of the display with respect to the housing may have been constrained by these and other needs.

Recent advances in computing devices have provided for the miniaturization or reduction in size of the components, such as computer components, used to power and drive the devices, such as processors, batteries, memory, integrated circuits, and the like. Consequently, further tailoring of housing designs, shapes, and configurations to provide additional or enhanced device functionality may therefore be desirable. Similarly, the configuration of a display of a computing device with respect to a housing can be tailored to provide additional or enhanced device functionality.

SUMMARY

One aspect of the present disclosure relates to a computing device having a peripheral housing that defines a cavity and an internal housing volume. The computing device includes a display disposed with the cavity and moveably attached to the peripheral housing. A battery, a processor, and memory are disposed entirely within the internal housing volume. The cavity defined by the housing can be an aperture and the display can have a peripheral shape that corresponds to the shape of the aperture. In some instances, the peripheral housing has a constant cross-section.

In some embodiments, the peripheral housing can be proud of the display and the peripheral housing and the display can together define a carrying handle for the computing device. The peripheral housing can also act as a physical support for the computing device when the display is rotated relative to the peripheral housing. The cross-sectional area of the peripheral housing can be substantially circular. The computing device can be rotatably and selectively attached to the peripheral housing on a first surface and a second surface of the display. The peripheral housing can include an input component that is removable from the computing device and that transmits an input from a user to the computing components. A portion of an exterior surface of the peripheral housing can include a second display to provide visual information to a user. The display can be reflective or can be substantially transparent.

Another aspect of the present disclosure relates to a computing device having a peripheral housing defining an aperture or display area, the peripheral housing defines an internal housing volume extending substantially around the aperture. The computing device includes computing components that are disposed exclusively within the internal housing volume. A display is also disposed within the aperture and attached to the peripheral housing. The display can have a first major surface and a second major surface opposing the first major surface, the first major surface defining a front surface of the device and the second major surface defining a rear surface of the device. The display can be moveably attached to the peripheral housing and can be attached such that the peripheral housing is proud of the display. In some embodiments, a first portion of the peripheral housing can be rotatably attached to a second portion of the peripheral housing such that the first portion can rotate out of a plane of the peripheral housing. Additionally, the display can be disposed within the aperture or display area defined by the peripheral housing and attached to the housing at one or more locations such that the first major surface and the second major surface of the display are substantially unobstructed by any other portion of the computing device.

In some embodiments, a portion of the peripheral housing having a first length can be adjustable to a second length different than the first length. The peripheral housing can include an input component removably positioned entirely within the cross-sectional area of the peripheral housing such that at least a portion of the input component can be moved outside of the cross-sectional area of the peripheral housing.

According to another aspect of the present disclosure, a computing device can include a peripheral housing that defines an aperture, the peripheral housing further defining an internal volume of the peripheral housing extending substantially around the aperture. The computing device can further include a display having a first major surface, a second major surface opposing the first major surface, and a peripheral shape corresponding to a shape of the aperture defined by the peripheral housing, the display can be disposed within the aperture defined by the peripheral housing and can be attached to the housing at one or more locations, such that peripheral housing is proud of the first major surface of the display and the first major surface and the second major surface of the display are substantially unobstructed by any other portion of the computing device. The computing device can also include one or more computing components, such as components to power and provide information or data to the display, the one or more computing components can be positioned entirely within the internal volume defined by the peripheral housing, wherein at least a portion of the peripheral housing is movable relative to the display to provide a physical support for the computing device such that the first major surface of the display is oriented non-horizontally when the computing device is disposed on a horizontal surface.

In some embodiments, the display can be reflective or can be substantially transparent. The peripheral housing can include an input component to receive an input from a user and communicate the input to a processor of the computing device, and the input component can be removably positioned entirely within the internal volume defined by the peripheral housing, such that at least a portion of the input component can be moved outside of the internal volume defined by the peripheral housing. The peripheral shape of the display and the shape of the aperture can be substantially rectangular.

BRIEF DESCRIPTION OF THE DRAWINGS

The disclosure will be readily understood by the following detailed description in conjunction with the accompanying drawings, wherein like reference numerals designate like structural elements, and in which:

FIG. 4A shows a sectional view of the computing device of FIG. 1.

FIGS. 4B-4E show sectional views of peripheral housings with different cross-sectional shapes.

DETAILED DESCRIPTION

Figure 1A:
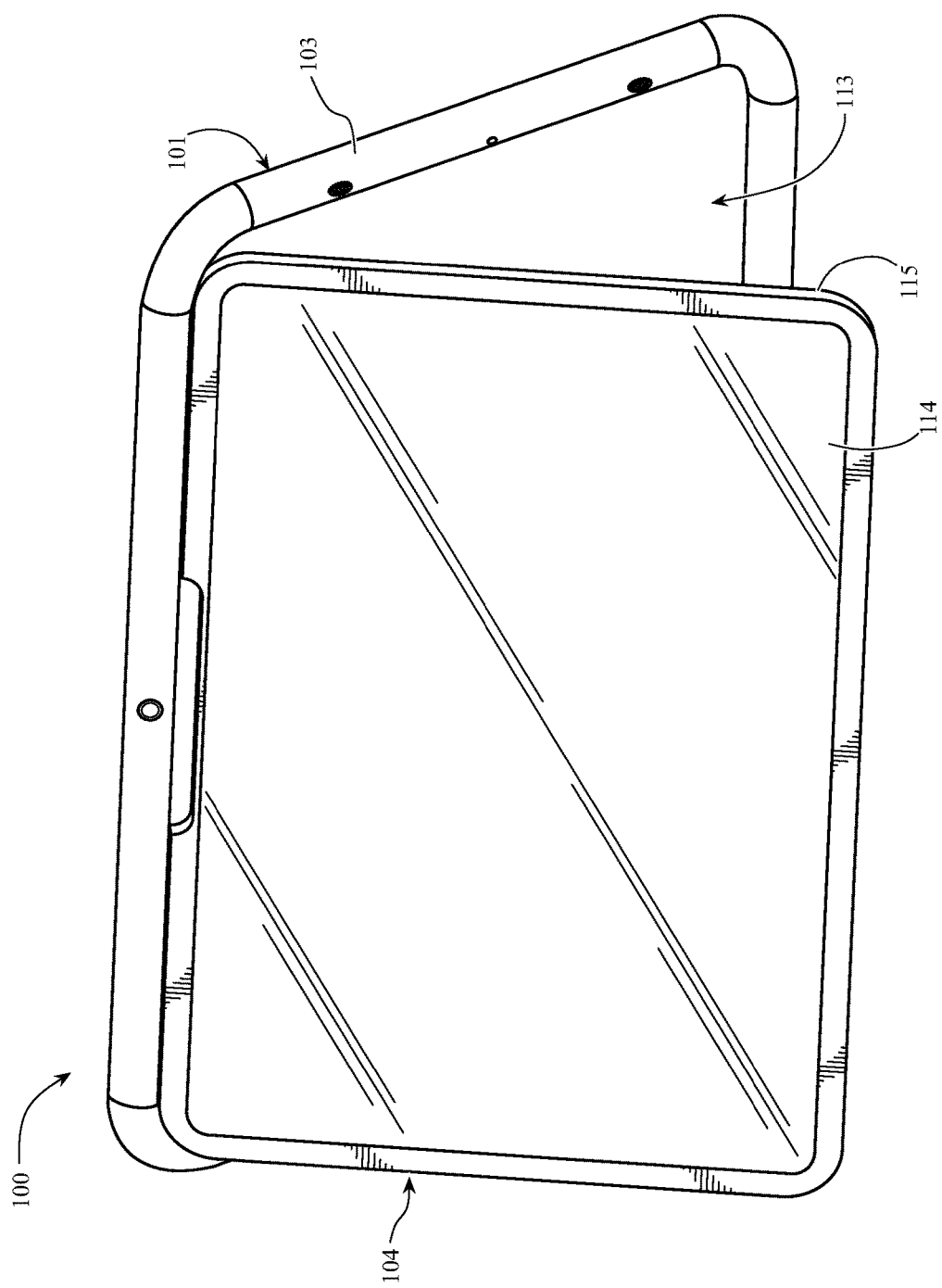
FIG. 1A shows a perspective view of a computing device.

The present description provides examples, and is not limiting of the scope, applicability, or configuration set forth in the claims. Thus, it will be understood that changes can be made in the function and arrangement of elements discussed, without departing from the spirit and scope of the disclosure, and various embodiments can omit, substitute, or add other procedures or components as appropriate. For instance, methods described herein can be performed in an order different from that described, and various steps can be added, omitted, or combined. Also, features described with respect to some embodiments can be combined in other embodiments.

The present description provides computing devices that can include a peripheral housing that is disposed about a periphery of a display area housing a display. The computing components of the computing device are disposed exclusively within the peripheral housing surrounding the periphery of the display area. The display can be movably attached to the peripheral housing. The peripheral housing containing the computing components can additionally define an internal volume which, in some examples, can have a constant or substantially constant cross-sectional area. Further, the peripheral housing and the display can be moved relative to each other in a variety of configurations, for example so that the peripheral housing, either alone or in cooperation with the display, can act as a support for the device.

Traditionally, computing devices can include a housing and a display that together cooperate to define an internal volume where various components may be contained. The display can include a first major surface, for example, a surface that displays information to a user, and a second major surface opposing the first major surface. Thus, in traditional computing device configurations, the housing and components are both positioned behind and obstruct the second major surface of the display. This can result in a computing device that has a substantial thickness and that is restrained in the configurations it can be provided in.

The computing devices described herein can include a variety of designs and configurations. Such computing devices can include a housing that includes a peripheral housing which alone defines an internal volume and a display attached to the housing. This arrangement can provide for a variety of different and novel form factors for the computing devices described herein. This configuration also allows for both the first and second major surfaces of the display to be unobstructed by other portions of the computing device, thereby allowing for movement of the peripheral housing or display relative to one another.

In some embodiments, one or more portions of the housing can be movable with respect to one or more other portions of the housing. Consequently, the display is free to move relative to the housing in a variety of manners such that the computing device can have a number of different arrangements or configurations. For example, in some embodiments the display and housing can have a first configuration that minimizes the depth of the computing device, for instance to allow for ease of transport by a user. In a second configuration, the housing is moved relative to the display to act as a physical support or stand for the computing device when it is positioned on a surface.

Similarly, the configuration of the housing and display of a computing device, as described herein, can allow for a variety of designs to achieve any number of desired functionalities. For example, in some embodiments, the peripheral housing can include a carrying handle to allow for ease of transport by a user; the peripheral housing can include one or more removable components, for example to act as input components or devices, such as a stylus, keyboard, mouse, or other input device; and the peripheral housing can include one or more sensors that may, for example, sense the movement of a user's hands within the peripheral housing, allowing the user to reach through the aperture of the peripheral housing and use gestures to interact with the computing device.

The display of the computing device can include any form of display known in the art or as will be developed in the future. In some embodiments, the display can be a conventional display for a computing device, such as an LED display, OLED display, LCD display, or the like. In some embodiments, however, the display can be a transparent display, a mirrored display, or a switchable mirrored display.

These and other embodiments are discussed below with reference to FIGS. 1-22. However, those skilled in the art will readily appreciate that the detailed description given herein with respect to these figures is for explanatory purposes only and should not be construed as limiting.

FIG. 1A shows an example of a computing device 100 as discussed herein, including a housing 101 and a display 104. The computing device 100 including a peripheral housing can be a computer, but this is merely one representative example of a device according to the present disclosure. The computing device 100 can, for example, correspond to a portable media player, a media storage device, a portable digital assistant ("PDA"), a tablet computer, a computer, a mobile communication device, a GPS unit, a remove control device, and the like. The computing device 100 can be referred to as an electronic device, or a consumer device.

The housing 101 of the computing device 100 can include a peripheral housing 103. In some embodiments, the peripheral housing 103 can include or be formed from a metallic material, a ceramic material, an amorphous material such as glass or an amorphous metal, a polymeric material, or combinations thereof. In some embodiments, the peripheral housing 103 can be aluminum or an aluminum alloy. The peripheral housing 103 can have a constant cross-sectional area, such that, for example, the peripheral housing 103 can have substantially the same dimensions (e.g., diameter, height, width, depth, etc.) at a first location and a second, different location. In some embodiments, the peripheral housing 103 defines an aperture 113 or display area. For example, the peripheral housing 103 can define a centrally located aperture 113, with the peripheral housing 103 extending away from the aperture 113. In addition to defining the aperture 113, the peripheral housing 103 can define an internal volume of the housing 101 that extends throughout all or a portion of the peripheral housing 103. The internal volume can have a constant cross-sectional area. Alternatively, the peripheral housing 103 can have a variable cross-sectional area, or a cross-sectional shape, that is different from that shown in FIG. 1A. In some embodiments, the internal volume can extend substantially around the entirety of the aperture 113 or display area defined by the peripheral housing.

The peripheral housing 103 can additionally include an outer layer or layers that can cover all or one or more portions of the exterior surface of the peripheral housing 103. The outer layer can include or be formed from any number or variety of materials such as polymers, metals, fabrics, ceramics, organic materials like wood, and the like. For example, in some embodiments, a fabric layer can cover all or one or more portions of the exterior surface of the peripheral housing 103. In some examples, the fabric layer can extend substantially across the aperture 113 or display area to cover one side of the aperture 113 or display area. In some examples, the layer can provide protection to the peripheral housing 103 or device 100. In some examples where the layer is a conductive fabric, the layer can enhance the ability of the device 100 to dissipate heat, in addition to providing protection to the external surface of the peripheral housing 103.

The computing device 100 further includes a display 104, also referred to as a display assembly 104. In some embodiments, the display 104 is positioned within the aperture 113 or display area defined by the peripheral housing 103. As discussed herein, the display 104 can be movably or rotatably attached to the peripheral housing 103 at one or more locations. Such an attachment configuration can allow for the computing device 100 to include a number of different physical configurations, for example, a number of different configurations of the position of the display 104 and peripheral housing 103 relative to one another.

The display 104 can have a substantially thin or flat profile. In some embodiments, the display 104 can include a first major surface 114 and a second major surface 115 opposing the first major surface 114. In some embodiments, visual content is displayed on the first major surface 114 and/or the second major surface 115 of the display 104. Due to the positioning of the display 104 in the aperture 113 defined by the peripheral housing 103, in some embodiments both the first major surface 114 and the second major surface 115 of the display 104 can be substantially unobstructed by any portion or portions of the computing device 100. Again, such an unobstructed arrangement can allow the display 104 to be moved relative to the housing 101 or peripheral housing 103 in a variety of configurations as discussed herein.

The display 104 can be any form of display, component, or device used to display visual content to a user. For example, in some embodiments the display 104 can be an LED display, an OLED display, or an LCD display. In some embodiments, the display 104 can be any form of display now known in the art or as may be developed in the future. In some embodiments, the display 104 can be a touch screen display, or can have touch detecting capabilities. In some embodiments, however, the computing device may be capable of detecting a user's touch and/or a position of an appendage of the user by components other than the display 104. In some embodiments, as discussed herein, the display 104 can be selectively reflective and/or can be selectively transparent.

The device 100 can also include internal components, such as processors, memory, circuit boards, batteries, light emitting diodes (LEDs), fans, sensors, and the like. Such components can be disposed exclusively and entirely within the internal volume defined by the peripheral housing 103 and can be affixed to the peripheral housing 103 via internal surfaces, attachment features, threaded connectors, studs, posts, or the like, that are formed into, onto, defined by, or otherwise part of the peripheral housing 103. In some embodiments, the internal components of the device 100 can be entirely contained within the internal volume defined by the peripheral housing 103. That is, in some embodiments, all of the components of the device 100, except the display 104, can be positioned entirely within the internal volume defined by the peripheral housing 103.

In some examples, the device 100 can include one or more components that can allow for a battery or batteries of the device 100 to be charged wirelessly. For example, the device 100 can include an induction coil that can inductively couple with a corresponding coil of a charging station, a mat, or a pad. Thus, in some cases, the device 100 can be charged or powered in any number of a wired or wireless manners.

An induction coil of the device 100 can be located in a portion of the peripheral housing 103 that interfaces with and/or contacts a flat or horizontal surface. For example, in the configuration of device 100 depicted in FIG. 1A, the induction coil can be disposed in a bottom portion of the peripheral housing 103. In some cases, however, an induction coil or coils can be disposed within the peripheral housing such that the induction coil or coils can align with a surface to enable inductive charging in a variety of configurations of the device 100, as discussed herein. During use, the device 100 can be positioned on top of or adjacent to a corresponding charging mat or pad such that an induction coil of the device 100 is substantially aligned with the charging mat or pad to enable inductive coupling between the induction coil of the device 100 and the mat or pad.

The display 104 and peripheral housing 103 can be positioned in a variety of configurations relative to one another such that the peripheral housing 103 can act as a physical support or stand for the display 104. Although the peripheral housing 103 and display 104 are shown disposed at one angle relative to one another in FIG. 1A, the display 104 and peripheral housing 103 can, in some embodiments, be rotated to any angle, or between any range of angles. Thus, in some embodiments, the peripheral housing 103 can cooperate with the display 104 to support the display in a non-horizontal position when disposed on a horizontal surface, for example at any angle of less than about 90 degrees, less than about 135 degrees, or less than about 180 degrees.

Figure 1B:
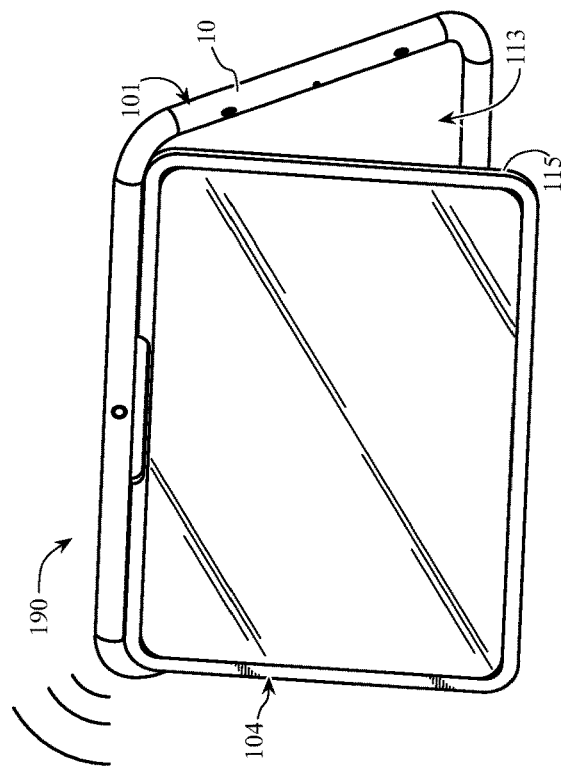
FIG. 1B shows a perspective view of multiple computing devices.

FIG. 1B illustrates an example of multiple computing devices 100, as discussed herein, each computing device including a housing 101 including a peripheral housing 103 and a display 104. In this example, two or more devices 100 can include components that allow the devices to communicate with each other, for example, via electromagnetic waves or wireless protocols such as Wi-Fi, Bluetooth, ultra-wideband, and the like. In some cases, a first device 100 can detect or determine its proximity relative to a second device 190, when the devices are within a certain distance of one another. By way of example, the first device 100 may detect the second device 190 when it is within about 50 feet, about 25 feet, about 10 feet, about 5 feet, or about 1 foot or closer, relative to the first device. The devices 100, 190 can thus include appropriate internal components within the peripheral housing 103 to enable this functionality, for example one or more antennas, transmitters, receivers, processors including appropriate firmware, or other wireless components.

The device 100, 190 can also include a component to determine the spatial orientation of the device 100. For example, the device 100, 190 can include a gyroscope within the peripheral housing 103 that can determine the physical or spatial orientation of the device 100, 190, relative to the ground. As a result, multiple devices 100 can determine the proximity and/or distance between each device 100, as well as the relative spatial orientation of each device 100, 190 with respect to one another. In some cases, a processor and/or memory of the device 100, 190 can include software to detect the proximity and orientation of nearby devices 100, 190.

Multiple devices 100 can thus cooperate to provide a user or users with a number of desired configurations and functionalities. For example, in some cases, a first device 100 can be positioned on a horizontal surface with the display 104 disposed substantially parallel to the surface. A second device 190 can be positioned proximate to the first device 100, for example in the configuration depicted in FIG. 1A. The two devices can detect their proximity relative to one another and their respective orientations, and can perform an action or prompt a user based on the detected proximity and orientation. For example, the first horizontal device 100 can display a keyboard on the display 104 that a user can interact with, while the second device 190 can be controlled by the user's input on the first device. In some cases, the displays 104 of multiple devices 100, 190 can cooperate. For example, two device 100, 190 can detect their proximity relative to one another and the two displays 104 can both be used to display visual content, such as an image, that spans both displays.

Figure 2:
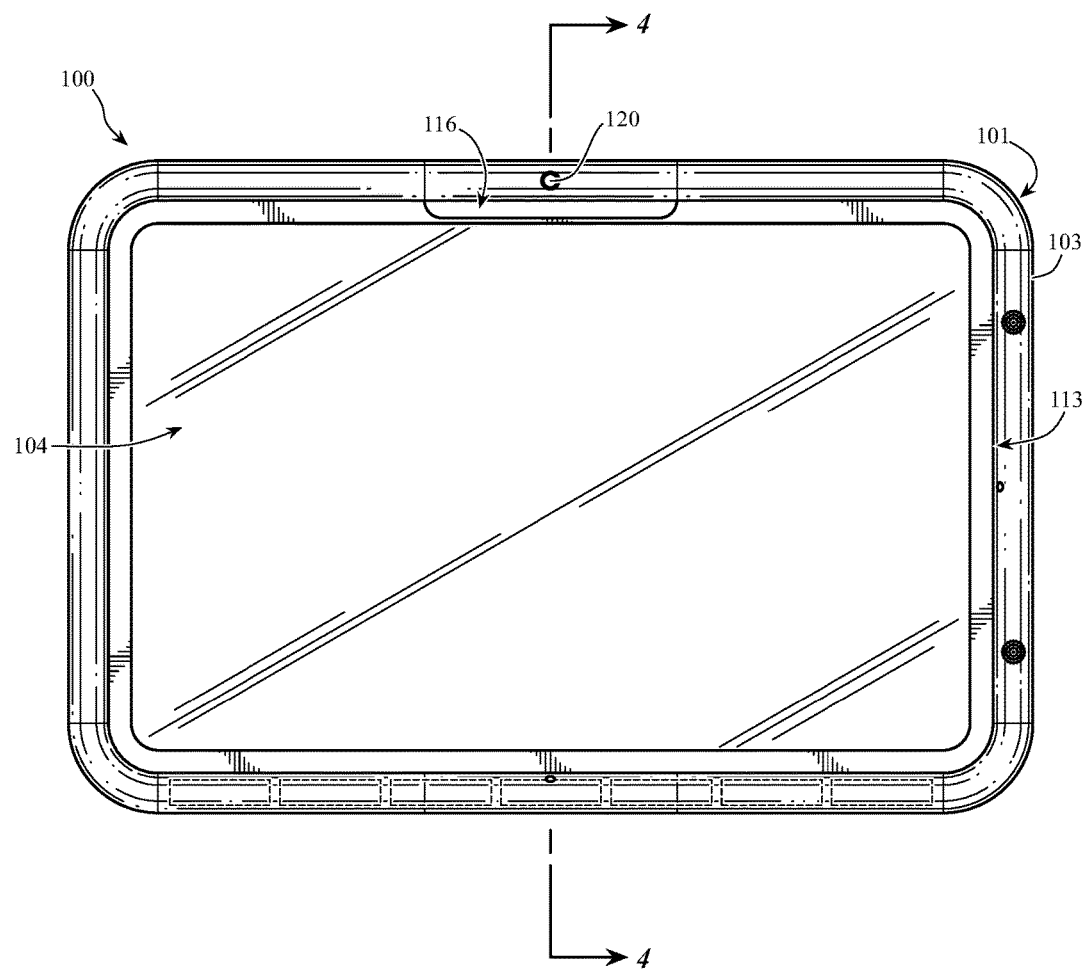
FIG. 2 shows a front view of the computing device of FIG. 1.

As described above, a device 100 can be used or positioned in a variety of configurations, as desired by a user. FIG. 2 illustrates the above described computing device 100 in a different configuration.

FIG. 2 illustrates a front view of the computing device 100 arranged in a second configuration. In some embodiments, the aperture 113 defined by the peripheral housing 103 can have a shape that is rectangular or substantially rectangular. In some other embodiments, however, the aperture 113 can be any shape, such as a circular aperture 113, an ovoid aperture 113, or even an aperture 113 having an irregular shape. The display 104 positioned within the aperture 113 can have a peripheral shape that corresponds to, or is substantially similar to, the shape of the aperture 113, such that the display 104 substantially fills the entire aperture 113. Thus, in some embodiments, the display 104 can have a peripheral shape that is rectangular or substantially rectangular. In some embodiments, the display 104 can be any shape, such as a circular display, an ovoid display, or even a display having an irregular shape.

In some embodiments, the display 104 may not substantially fill or occlude the entirety of the aperture 113. For example, in some embodiments, one or more portions of the aperture 113 surrounding an edge of the display 104 may not be occupied by the display 104, thereby forming a gap between a portion of the display 104 and the peripheral housing 103. In some embodiments, this gap can serve as a carrying handle 116 to allow for a user to easily carry or transport the device 100.

In some embodiments, and as discussed herein, the peripheral housing 103 can include a variety of other features or components to provide various desired functionalities to the user. For example, in some embodiments, the peripheral housing 103 can include a user facing camera 120. Such a camera 120 can allow for a user to record images or video of themselves to the device 100, or to place video calls with the device 100. Other user-facing components can also be included in the peripheral housing 103. For example, components such as motion sensors, ambient light sensors, speakers, and similar electronic components. In some embodiments, the peripheral housing 103 can include apertures or openings to facilitate the function of such components. Additional views of the computing device 100 are provided in FIG. 3 and discussed in further detail below.

Figure 3:
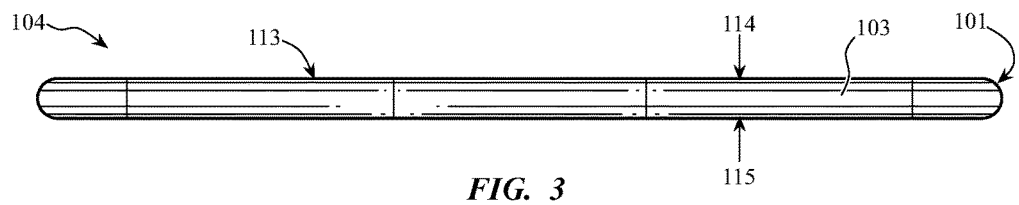
FIG. 3 shows a side view of the computing device of FIG. 1.

FIG. 3 shows a side view of the computing device 100 arranged in the second configuration. As can be seen, the peripheral housing 103 can have a depth or thickness greater than a depth or thickness of the display 104 (not shown) disposed within the aperture 113 defined by the peripheral housing 103. In some embodiments, the display 104 can be positioned at any location within the depth of the aperture 113 defined by the peripheral housing 103. That is, in some embodiments, the first major surface 114 of the display 104 can be substantially aligned with a front-most portion of the exterior surface of the peripheral housing 103. In some embodiments, however, the second major surface 115 of the display 104 can be substantially aligned with a backmost portion of the exterior surface of the peripheral housing 103. The terms front-most and backmost are used herein for reference only and are not intended to limit or otherwise define the orientation of the peripheral housing 103, display 104, and computing device 100.

In still other embodiments, the display 104 may not be aligned with either a front-most or backmost exterior surface of the peripheral housing 103, such that the display is contained entirely within a thickness or depth of the peripheral housing 103. Thus, in some embodiments, a portion of the peripheral housing 103 can be proud of, or raised from, the first major surface 114 of the display 104, thereby protecting the display. This configuration can allow for components of the computing device 100 to be housed within the peripheral housing 103 and still be raised above or proud of the display 104 as discussed herein. Further, as can be seen in FIG. 3, in some embodiments no portion of the computing device 100 other than the display 104 can extend past or outside of the internal volume defined by the peripheral housing 103.

Figure 1B:
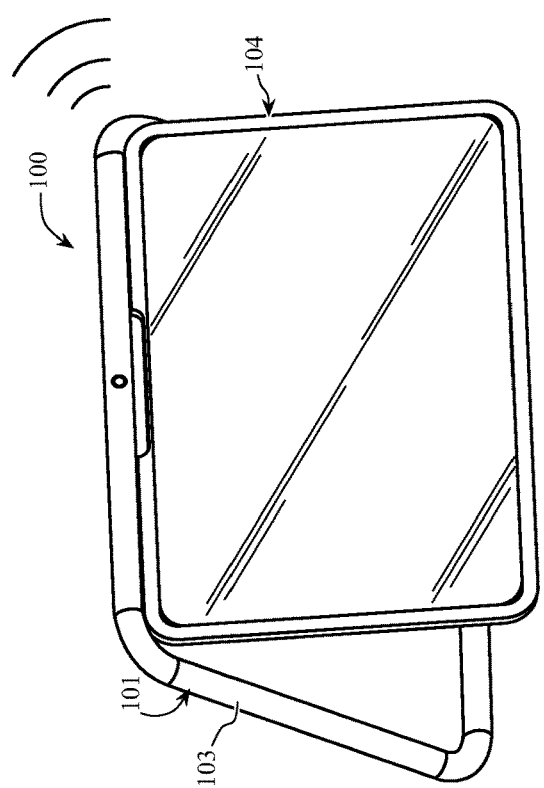

In addition to the functionalities and components discussed with respect to FIGS. 1-3, the internal volume defined by the peripheral housing 103 can provide for additional functionalities, for example by containing components of the device 100 therein. Additional details of the relative position and structure of the peripheral housing 103 and the display 104 are provided below with reference to FIGS. 4A-4E.

FIG. 4A shows a sectional view of the computing device 100, including the internal volume 130 defined by the peripheral housing 103. As can be seen, the peripheral housing 103 and the internal volume 130 defined by the peripheral housing 103 can have a constant cross-sectional area. In some embodiments, the one or more computing components 131 of the computing device can be positioned entirely within the cross-sectional area of the peripheral housing 103, for example in the internal volume 130 defined by the peripheral housing 103. As used herein, the term computing components is intended to be understood as including any hardware that can be used to perform the functions of a computer including, but not limited to, a processor; memory, including RAM, ROM, flash RAM, and other storage devices; a bus; computer subsystems; input/output controllers; central processors; display adapters; storage interfaces; drives; network cards or interfaces; antenna; and other computing hardware. Further, in some embodiments, a power component 132, such as one or more batteries, power supply, or transformer, can be positioned entirely within the cross-sectional area of the peripheral housing 103, such as in the internal volume 130 defined by the peripheral housing 103. In some embodiments, substantially all of the components of the computing device 100 that provide power and/or information/data to the display 104 can be contained within the cross-sectional area of the peripheral housing 103. In some embodiments, substantially all of the other components of the computing device 100, in addition to those that provide power and/or information/data to the display 104, can be contained within the constant cross-sectional area of the peripheral housing 103. As shown in FIGS. 4B-4E, the internal volume 130 of the peripheral housing 103 may assume any number of cross-sectional shapes including, but in no way limited to, a rectangle, a square or other quadrilateral, a hexagon, an oval, or any other geometric construct. Furthermore, the computing device 100 can be arranged in different orientations, as shown in FIG. 5.

Figure 5:
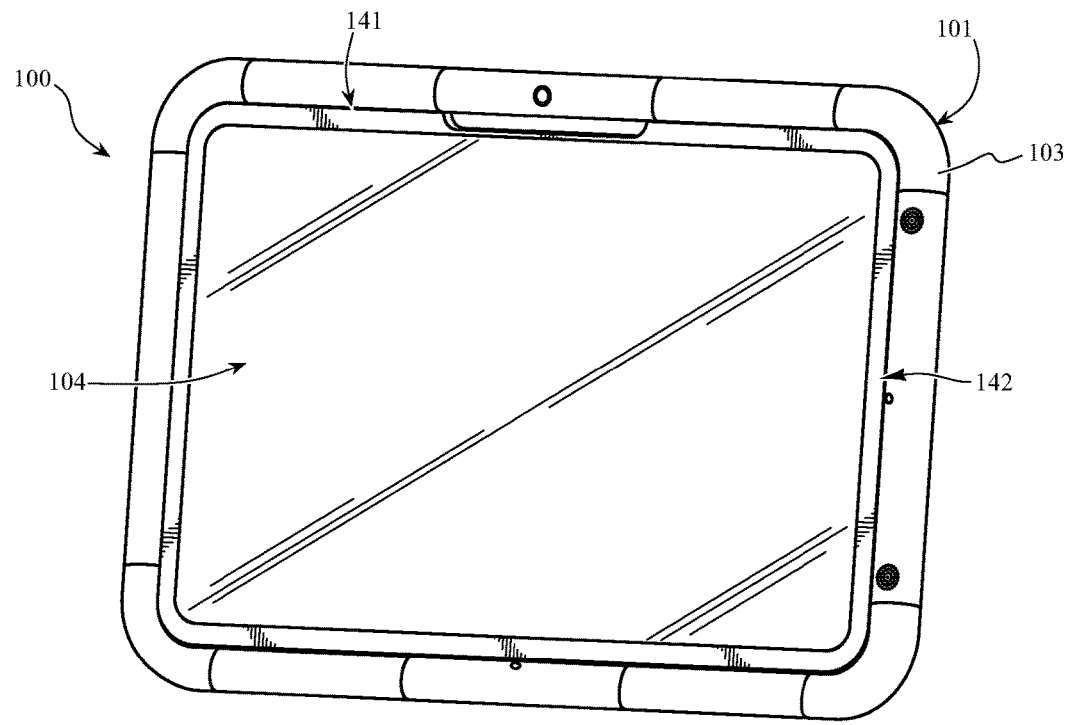
FIG. 5 shows a perspective view of the computing device of FIG. 1 arranged in a second configuration.

FIG. 5 shows a perspective view of computing device 100 arranged in a second, different configuration than that depicted in FIG. 1A. In some embodiments, the movable or rotatable attachment between the display 104 and the peripheral housing 103 can be adjustable by a user to a variety of angles and positions. In some embodiments, the movable or rotatable attachment between the display 104 and the peripheral housing 103 can be a friction clutch.

As can be seen in FIG. 5, the display 104 can include a first edge 141, and a second edge 142 disposed at an approximately right angle to the first edge 141. In some embodiments, the first edge 141 can be longer than the second edge 142. The display 104 can be movably or rotatably attached to the peripheral housing 103 at least along the first edge 141, for example, as shown in FIG. 1A, such that the display can rotate with respect to the peripheral housing 103 about an axis substantially aligned with the first edge 141. In some cases, the display 104 can additionally or alternatively be movably or rotatably attached to the peripheral housing 103 along the second edge 142, for example as depicted in FIG. 5.

The computing device 100 can thus be selectively moved between at least the arrangement or configuration depicted in FIG. 5 and the arrangement or configuration depicted in FIG. 1A by a user. For example, a user can position the computing device 100 on a surface, such as table or desk, in the arrangement depicted in FIG. 5 to view visual content on the display 104. The user may then wish to transport the device 100 to a second location, for example, another room. The user can rotate the display 104 and/or peripheral housing 103 relative to one another so that the device 100 assumes the arrangement depicted in FIG. 1A. The device 100 can then have a relatively thin profile and can be readily carried, for example, by a carrying handle 116 (FIG. 2). Once the device 100 has been transported to a second desired location, the user can again rotate the display 104 and/or peripheral housing 103 relative to one another, so that the device 100 again assumes the arrangement depicted in FIG. 5, or any other arrangement as desired by the user. A number of positioning configurations are further detailed in FIG. 6, and described below.

Figure 6:
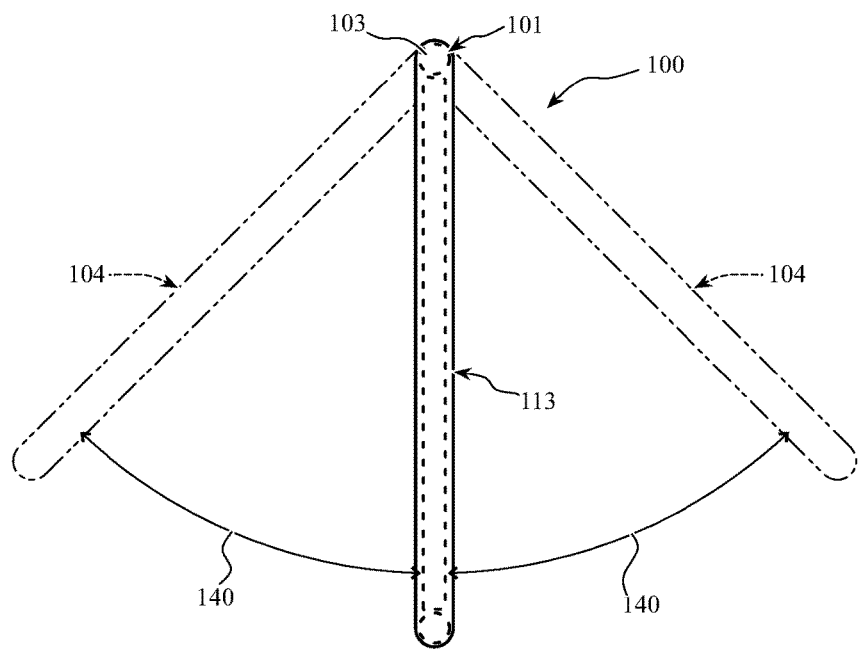
FIG. 6 shows a side view of the computing device of FIG. 5.

FIG. 6 shows a side view of the computing device 100, with arrows 140 illustrating the direction of movement or rotation of the display 104 relative to the peripheral housing 103. In some embodiments, the peripheral housing 103 and the display 104 can be moved or rotated relative to one another about an axis positioned at a location of attachment between the peripheral housing 103 and the display 104. For example, an attachment position can be located in line with a first edge of the display 104. In some embodiments, the display 104 can pass through the aperture 113 defined by the peripheral housing 103. In some embodiments, the rotation of the display 104 can be achieved by rotating a portion of the peripheral housing 103 attached to the display 104 relative to the rest of the peripheral housing 103.

While two different configurations of the device 100 are illustrated in FIGS. 1-5, the device is not limited to these configurations. Further, in some cases, the device 100 can include one or more movable, rotatable, or selective attachment locations between the peripheral housing 103 and the display 104. These additional or alternative attachment locations can provide for a variety of additional configurations of the device 100, as shown in FIG. 7.

Figure 7:
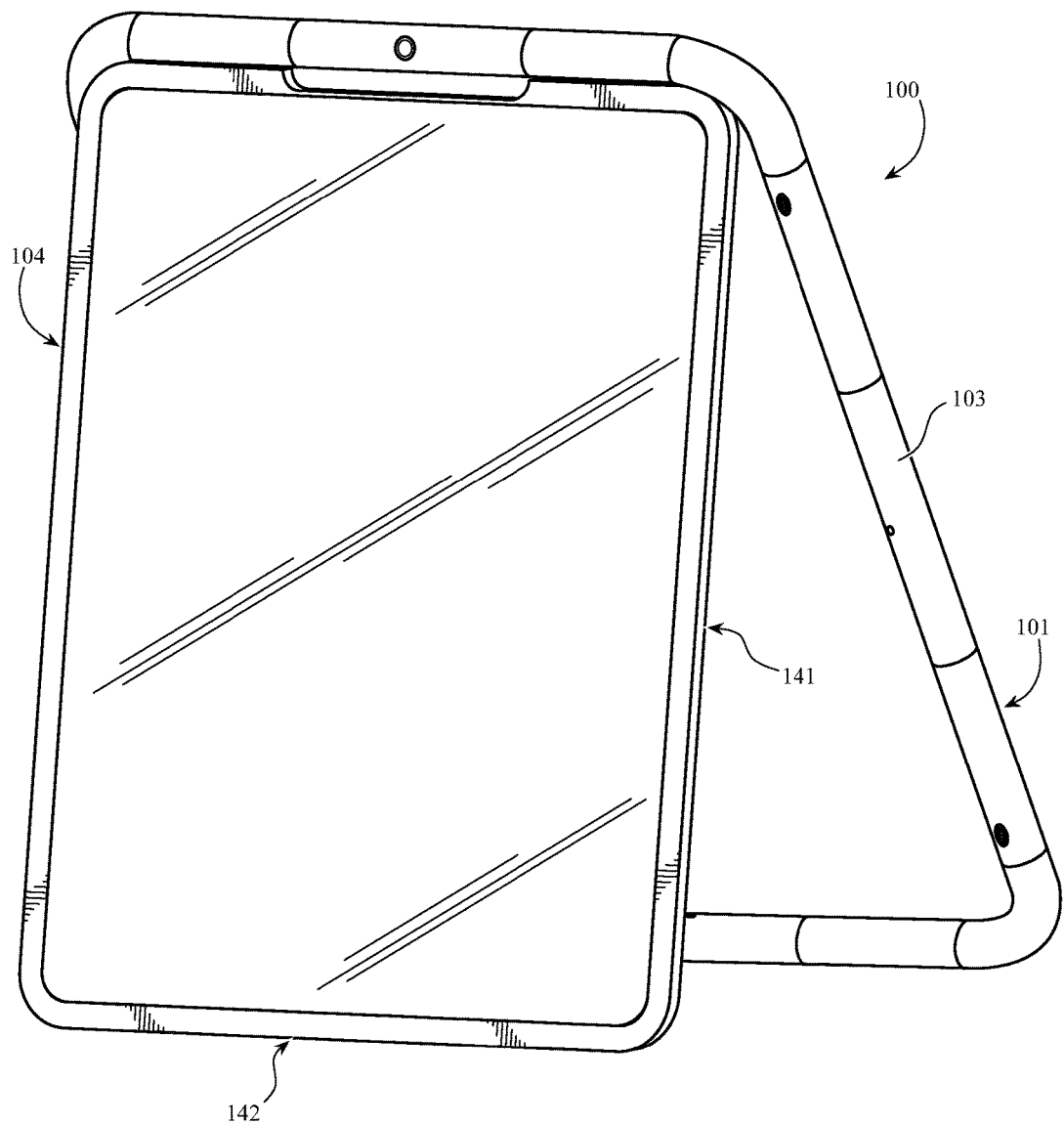
FIG. 7 shows a perspective view of a computing device.

FIG. 7 shows a perspective view of computing device 100. In this embodiment, the aperture 113 defined by the peripheral housing 103 and the display 104 have a substantially rectangular shape. That is, the aperture 113 and the display 104 can have a first edge 141 and a second edge 142 disposed at an approximately right angle to the first edge 141. In some embodiments, the first edge 141 can be longer than the second edge 142. The display can be movable relative to the peripheral housing 103 about an axis aligned with either the first edge 141 or the second, shorter edge 142. Thus, in some embodiments, the peripheral housing 103 and display 104 can be movable or rotatable with respect to one another about a first axis and a second, different axis. The second, different axis can be, for example, disposed at about a right angle to the first axis. In some embodiments including multiple axis of movement between the peripheral housing 103 and display 104, this functionality can allow for a user to position the computing device 100 on a horizontal surface in a first 'landscape' configuration, or a second, different, 'portrait' configuration depending on the needs or desires of the user. In some embodiments, the connection between the peripheral housing 103 and display 104 can be any number of mechanical or magnetic connections.

Figure 8:
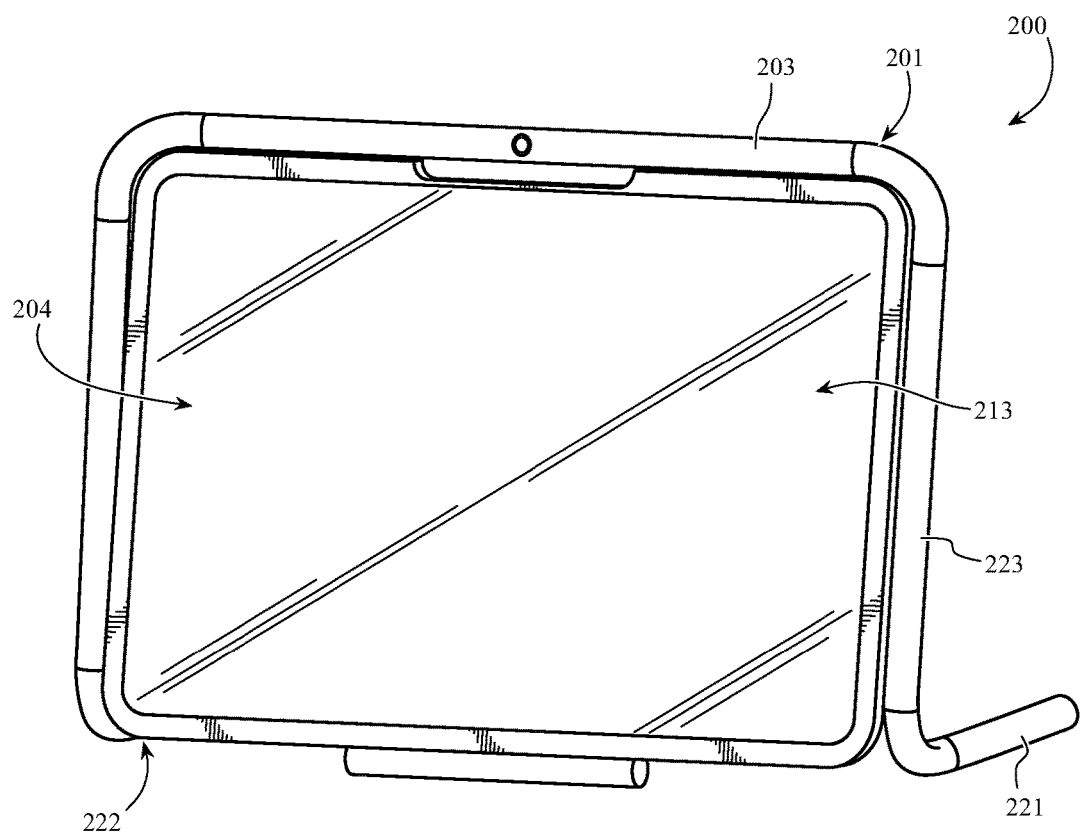
FIG. 8 shows a perspective view of a computing device.

The structures and features of the computing device 100, peripheral housing 103, and display 104 discussed with respect to FIGS. 1-7 can include any design or shape as desired to serve any number of functions or provide any number or type of device configurations. The following example computing devices illustrate a variety of different embodiments and designs for the computing devices described herein. Further, the features of the various embodiments described herein can be included and combined with one another in any combination. FIG. 8 details additional configurations and functionality of the peripheral housing 103.

FIG. 8 illustrates a computing device 200 capable of being arranged in a variety of configurations. The computing device 200 can have a housing 201 including a peripheral housing 203 that defines an aperture 213 and a display 204 positioned in the aperture 213 and attached to the peripheral housing 203 or housing 201. As with computing device 100, the computing device 200 can be a computer, but this is merely one representative example of a device according to the present disclosure. The computing device 200 can, for example, correspond to a portable media player, a media storage device, a portable digital assistant ("PDA"), a tablet computer, a computer, a mobile communication device, a GPS unit, a remote control device, and the like. The computing device 200 can be referred to as an electronic device, or a consumer device.

Figure 9:
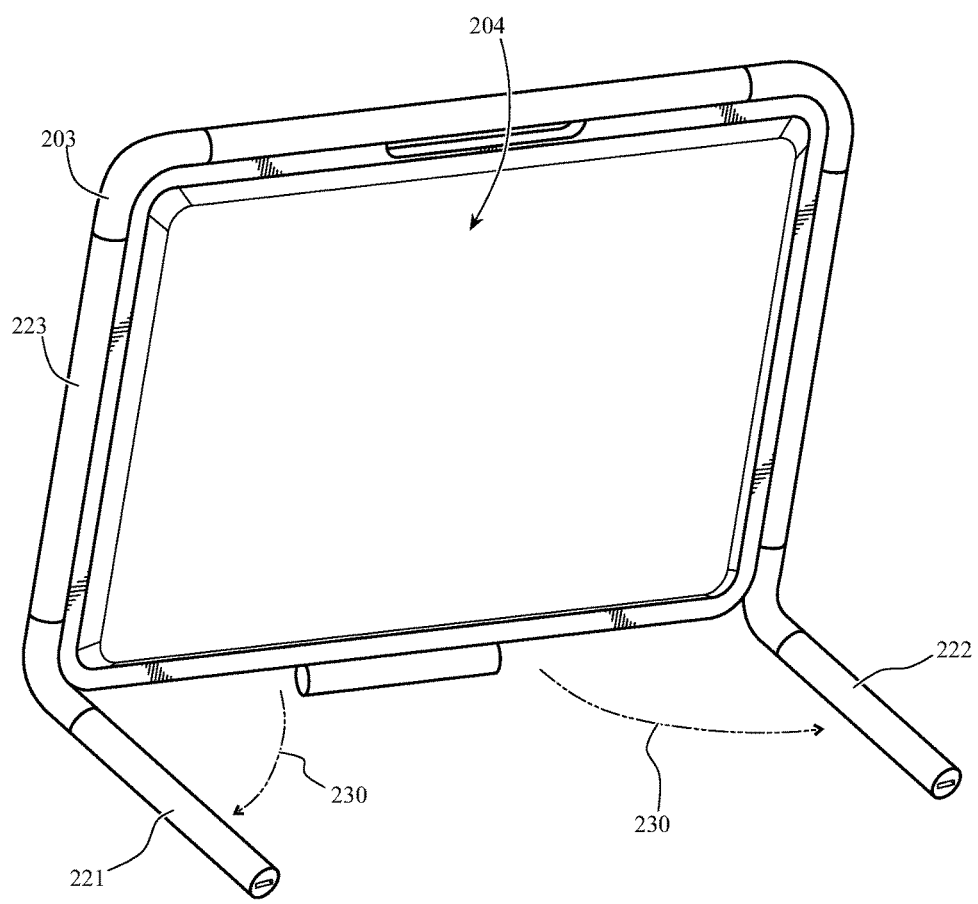
FIG. 9 shows a rear perspective view of the computing device of FIG. 8.

In some embodiments, the computing device 200 can have a first configuration or arrangement that is substantially similar to the arrangement of the computing device 100 as depicted in FIG. 5. In some embodiments, however, the peripheral housing 203 of computing device 200 can include one or more portions 221, 222 that are movably or rotatably attached to another portion or portions 223 of the peripheral housing 203. For example, as shown in FIG. 9, one or more portions 221, 222 can rotate out of a plane from the peripheral housing 203, as indicated by arrows 230. In some embodiments, when the one or more portions 221, 222 are rotated relative to the other portions 223 of the peripheral housing 203, the rotated portions 221, 222 can act as a physical support or stand for the display 204 or device 200. That is, in some embodiments, the rotated portions 221, 222 can support the display 204 in a non-horizontal position when disposed on a horizontal surface. Further, although one or more portions 221, 222 are illustrated as rotated out of the plane of the peripheral housing 203 in FIG. 8, in some embodiments, any portion or portions of the peripheral housing 203 can rotate relative to any other portion to provide a user with a variety of possible configurations of the device 200.

The structures and features of the computing device 200 discussed with respect to FIGS. 8-9 can include any design or shape as desired to serve any number of functions or provide any number or type of device configurations. The following example computing devices illustrate a variety of different embodiments and designs for the computing devices described herein. Further, the features of the various embodiments described herein can be included and combined with one another in any combination. Additional configurations of the computing device are described below with reference to FIGS. 10-11.

Figure 10:
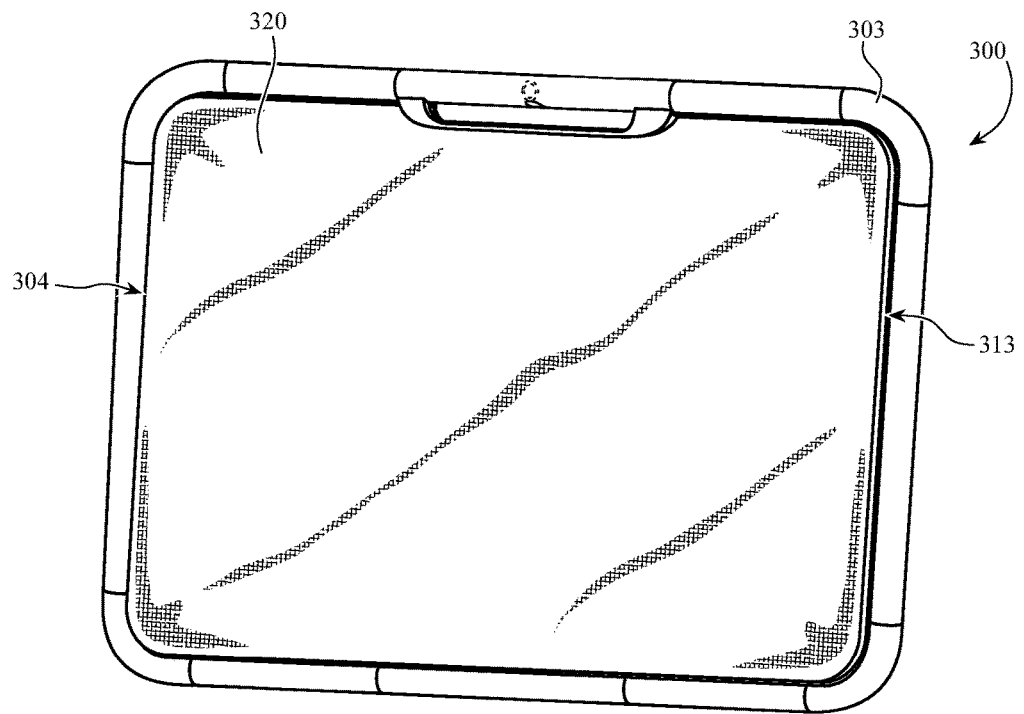
FIG. 10 shows a perspective view of a computing device.

FIG. 10 illustrates a computing device 300. The computing device 300 can be substantially similar to the computing devices 100, 200 discussed herein and can include a peripheral housing 303 that defines an aperture 313 and a display 304 positioned in the aperture 313 and attached to the peripheral housing 303. The computing device 300 can further include a cover 320 that can be rotatably or movably attached to the peripheral housing 303. The cover 320 can be movably or rotatably attached to the peripheral housing 303 at one or more locations of attachment, and in some embodiments, can act as a support or stand for the computing device 300. For example, in some embodiments, the cover 320 and peripheral housing 303 can be positioned relative to one another such that the peripheral housing 303 and cover 320 can cooperate to act as a physical support or stand for the display 304. Although the peripheral housing 303 and cover 320 are shown disposed at one angle relative to one another, the cover 320 and peripheral housing 303 can, in some embodiments, be rotated to any angle, or between any range of angles relative to one another. Thus, in some embodiments, the peripheral housing 303 can cooperate with the cover 320 to support the display 304 in a non-horizontal position when disposed on a horizontal surface, for example at any angle of less than about 90 degrees, less than 135 degrees, or less than 180 degrees.

Figure 11:
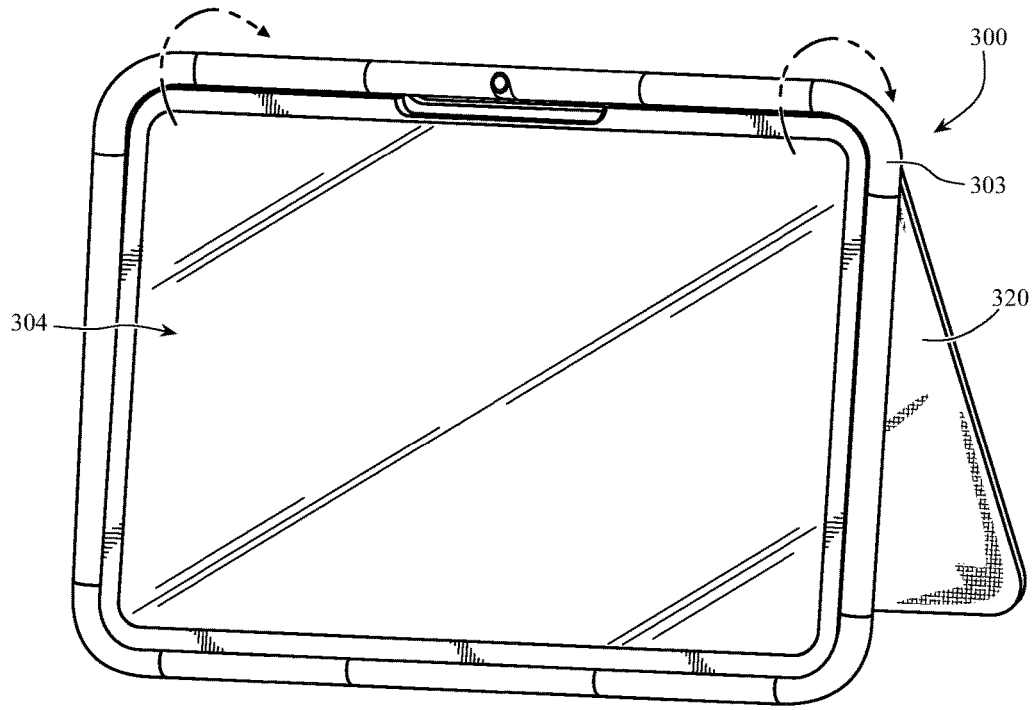
FIG. 11 shows a perspective view of the computing device of FIG. 10 arranged in a second configuration.

The cover 320 can have a second position or arrangement with respect to the peripheral housing 303 and display 304, for example, as shown in FIG. 11, where the cover 320 can be rotated into a position to substantially cover or protect a first major surface of the display 304, for example by entirely covering or occluding the entire first surface of the display 304. In some embodiments, the cover 320 can include or be formed from any number or variety of materials such as polymers, metals, fabrics, ceramics, organic materials like wood, and combinations thereof. In some embodiments, the cover 320 can include a fabric material, such as a synthetic or natural fabric. In some embodiments, the fabric can be a conductive fabric. That is, in some embodiments, the fabric material can be a relatively efficient conductor of heat and/or electricity. Thus, in some embodiments, a cover 320, including a conductive fabric, can serve to dissipate heat generated by the device 300.

The structures and features of the computing device 300 discussed with respect to FIGS. 10-11 can include any design or shape as desired to serve any number of functions or provide any number or type of device configurations. The following example computing devices illustrate a variety of different embodiments and designs for the computing devices described herein. Further, the features of the various embodiments described herein can be included and combined with one another in any combination. The computing devices discussed herein can include features that enable the device to assume a variety of configurations, including configurations that are a combination of multiple configurations described herein. Additional features and configurations are provided in FIGS. 12-14 and are described in detail below.

Figure 12:
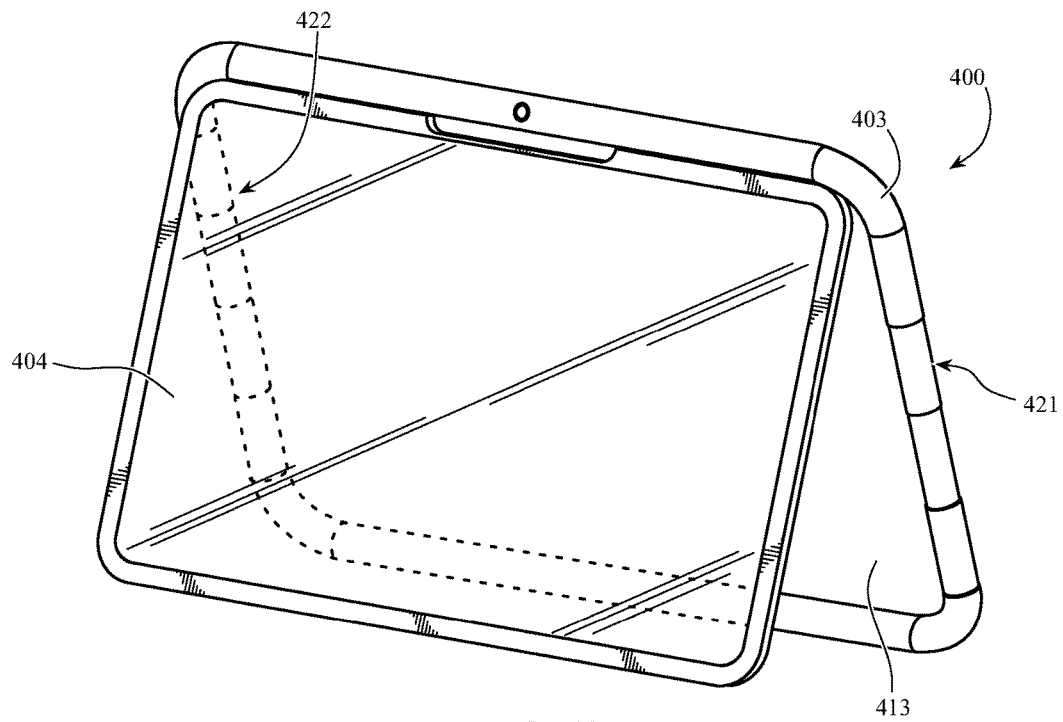
FIG. 12 shows a perspective view of a computing device.
Figure 13:
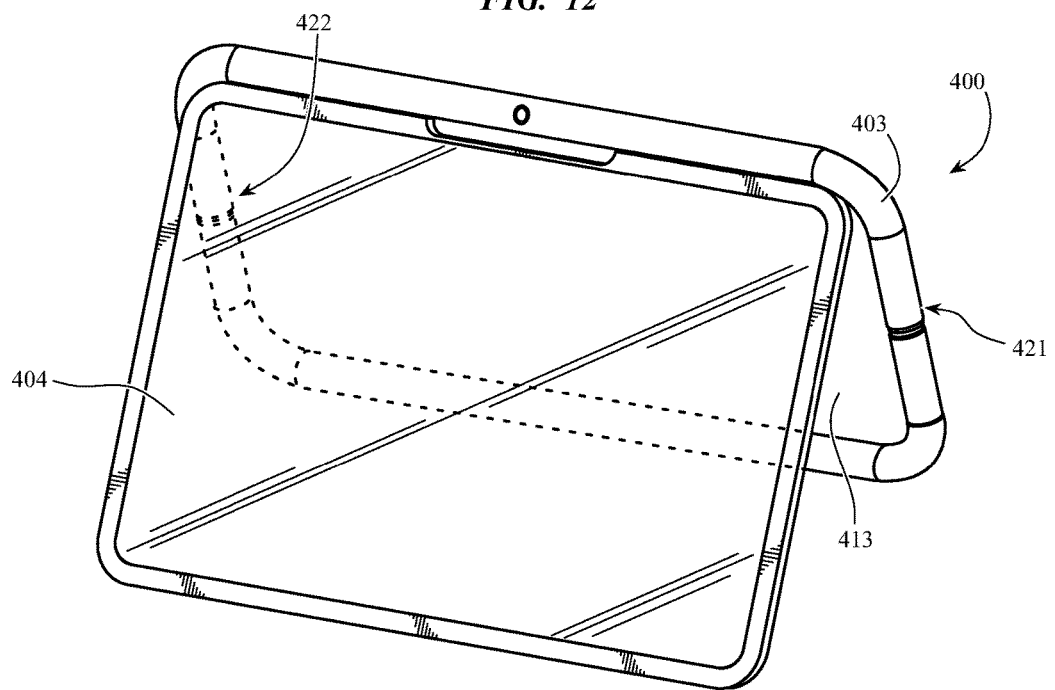
FIG. 13 shows a perspective view of the computing device of FIG. 12 arranged in a second configuration.

FIG. 12 shows a perspective view of a computing device 400 including telescoping functionality to enable a variety of device configurations. In some embodiments, one or more portions 421, 422 of the peripheral housing 403 can have a first length, for example where the aperture 413 defined by the peripheral housing 403 is approximately sized to receive the display 404, and can be adjustable to one or more second, shorter lengths, for example, as illustrated in FIG. 13.

In some embodiments, the adjustable portions 421, 422 of the peripheral housing 403 can thus be telescoping portions 421, 422 that can be adjusted to any desired length. In some embodiments, the portions 421, 422 may be positioned on opposing parts of the peripheral housing 403 such that the portions 421, 422 can be connected by another portion of the peripheral housing 403 and adjusted in concert. When, for example, the peripheral housing 403 is used as a support or stand for the device 400 as in FIG. 12, the portions of the peripheral housing 421, 422 can be adjusted, for example, shortened, to the position shown in FIG. 13 as desired by the user. Such a position can allow the device 400 to be configured to allow the user to comfortably draw or write on the display 404, for example, with a stylus or other component.

Figure 14A:
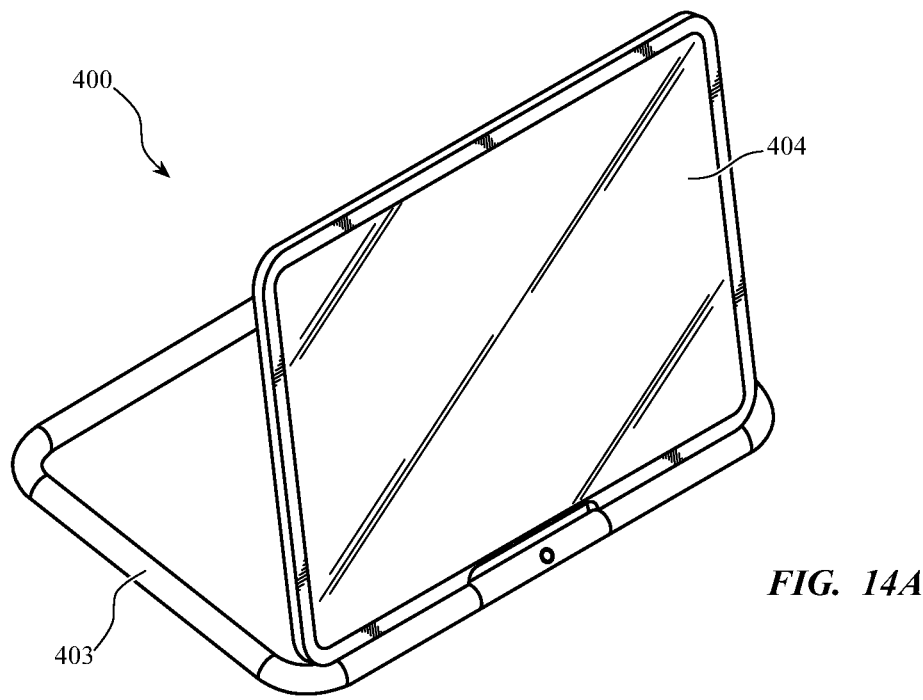
FIG. 14A shows a perspective view of a computing device.

The position of the display 404 in the second configuration can be achieved by other configurations of the device 400 or other devices described herein, for example, as shown in FIG. 14A. In some embodiments, the peripheral housing 403 can be positioned on a surface to support the device 400 and the display 404 can be rotated relative to the peripheral housing 403 up towards the user. Again, this configuration can allow the user to adjust the angle of the display 404 relative to horizontal to a desired position, for example, to aid in drawing or performing some other interaction or task via the display 404.

Figure 14B:
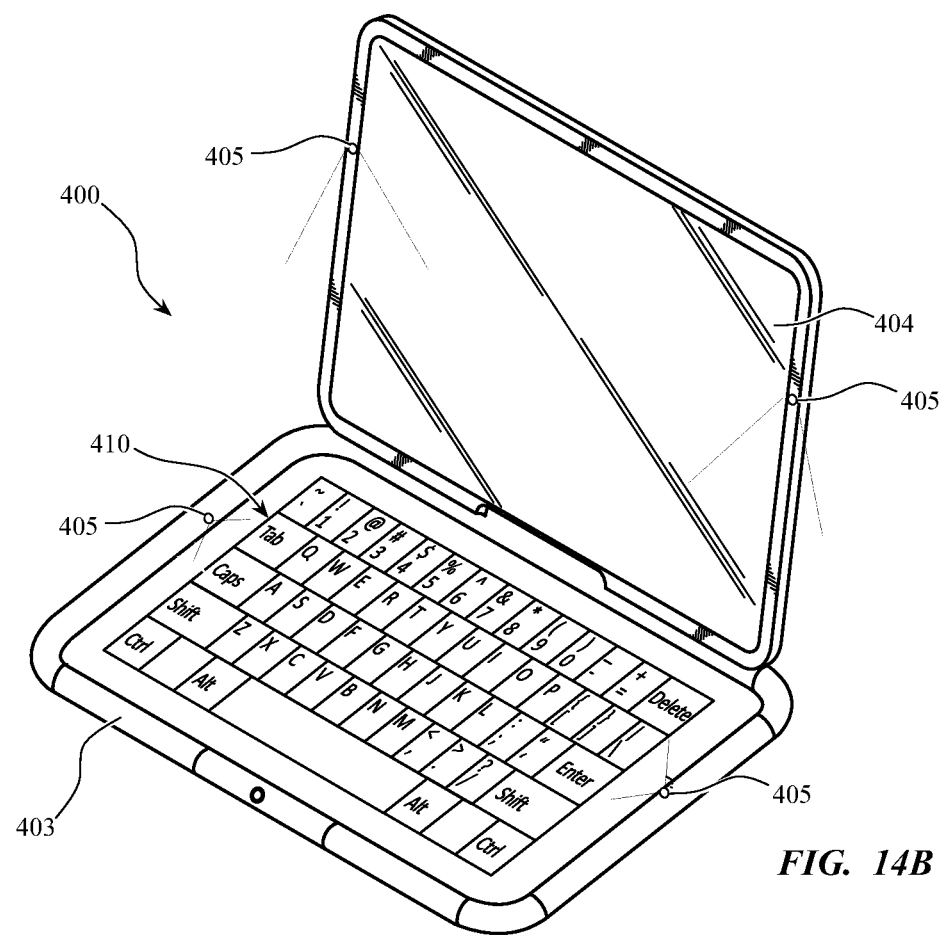
FIG. 14B shows a perspective view of the computing device of FIG. 14A in an alternate configuration

FIG. 14B illustrates a second, alternative configuration of the device 400. In this example, the peripheral housing 403 can be positioned or disposed on a surface to support the display 404. The display can be rotated relative to the peripheral housing 403 such that the display 404 can face the user. In some cases, the peripheral housing 403 can include one or more components within the internal volume of the peripheral housing 403 that can allow a user to interact with the device, for example via the aperture of the housing 403. In some cases, and as illustrated in FIG. 14B, the peripheral housing 403 and/or the display 404 can include one or more projectors 405 and one or more sensors, cameras, and/or other components to detect the position and motion of an extremity of a user. According to this example, an image of a keyboard 410 can be projected interior to the aperture of the peripheral housing 403, for example, onto a surface on which the peripheral housing 403 is located. Components within the peripheral housing 403 can detect when, for example, a user touches a projected image of a keyboard key and register this action as an input, for example, by causing the display 404 to react to the user touching the projected key. The components of the peripheral housing 403 can also detect and respond to gestures by a user. For example, when a user's hand is positioned over the aperture in the peripheral housing 403, the device 400 can detect a user's gesture, such as a swipe, pinch, finger movement, or other gesture, and cause the display 404 or device 400 to respond appropriately. Although an image of a traditional keyboard is depicted in FIG. 14B, the components within the peripheral housing 403 can project any image or combination of images as desired. Accordingly, the projected image or images can be determined by a processor of the device 400 based on a variety of factors, such as the device's location, orientation, currently running programs, user preference, and the like.

The structures and features of the computing device 400 discussed with respect to FIGS. 12-14B can include any desired design or shape to serve any number of functions or to provide any number or type of device configurations. The following example computing devices illustrate a variety of different embodiments and designs for the computing devices described herein. Further, the features of the various embodiments described herein can be included and combined with one another in any combination. The computing devices discussed herein can include features that enable the device to assume a variety of configurations, including configurations that are a combination of multiple configurations described herein. These varying configurations allow for added functionality to be provided by the peripheral housing 403, as shown in FIGS. 15-17.

Figure 15:
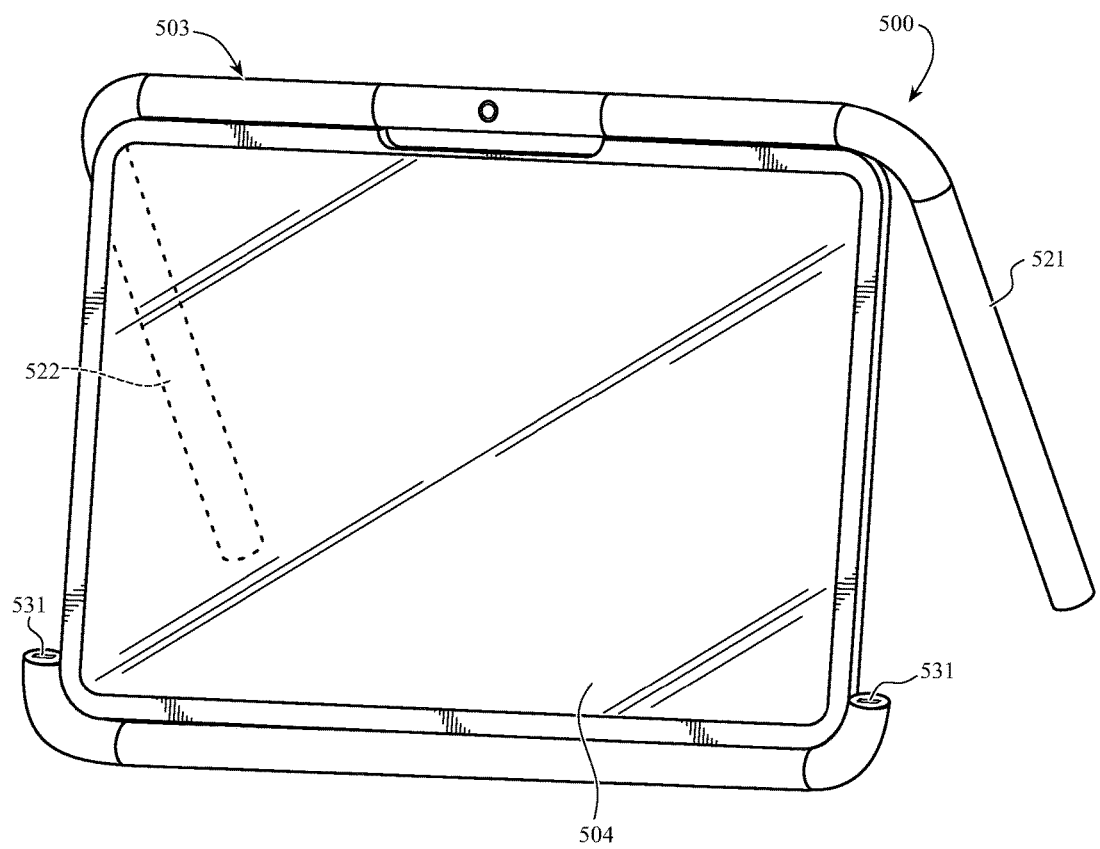
FIG. 15 shows a perspective view of a computing device.

FIG. 15 shows a perspective view of a computing device 500. The computing device 500 can be similar to computing device 200 as discussed herein. That is, the computing device 500 can include one or more portions of the peripheral housing 503 that can include one or more portions 521, 522 that are movably or rotatably attached to another portion or portions 523 of the peripheral housing 503. In some embodiments, a surface of the portions 521, 522 that are not exposed when the portions 521, 522 are positioned in line with the plane of the peripheral housing can include one or more input and/or output ports, data connectors, charging ports drives, etc. 531. These input/output ports 531 can thus be hidden or obscured when the device 500 is in a first configuration, for example, the configuration depicted in FIG. 1, but can be accessed when the portions 521, 522 of the peripheral housing 503 are rotated out to act as a support for the device 500.

The structures and features of the computing device 500 discussed with respect to FIG. 15 can include any desired design or shape to serve any number of functions or to provide any number or type of device configurations. The following example computing devices illustrate a variety of different embodiments and designs for the computing devices described herein. Further, the features of the various embodiments described herein can be included and combined with one another in any combination. The computing devices discussed herein can include features that enable the device to assume a variety of configurations, including configurations that are a combination of multiple configurations described herein. Additional removable elements can form a part of the peripheral housing 503, as shown in FIG. 16.

Figure 16:
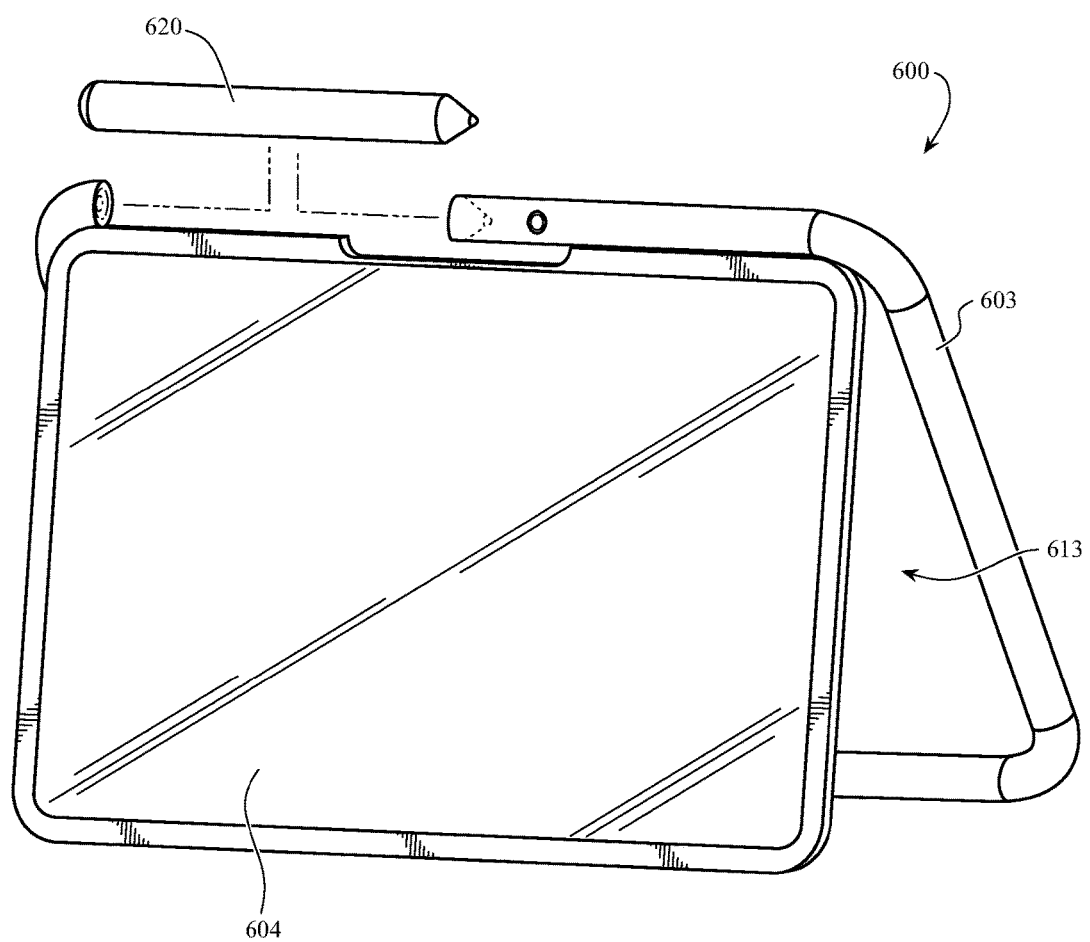
FIG. 16 shows a perspective view of a computing device including a removable component.
Figure 17:
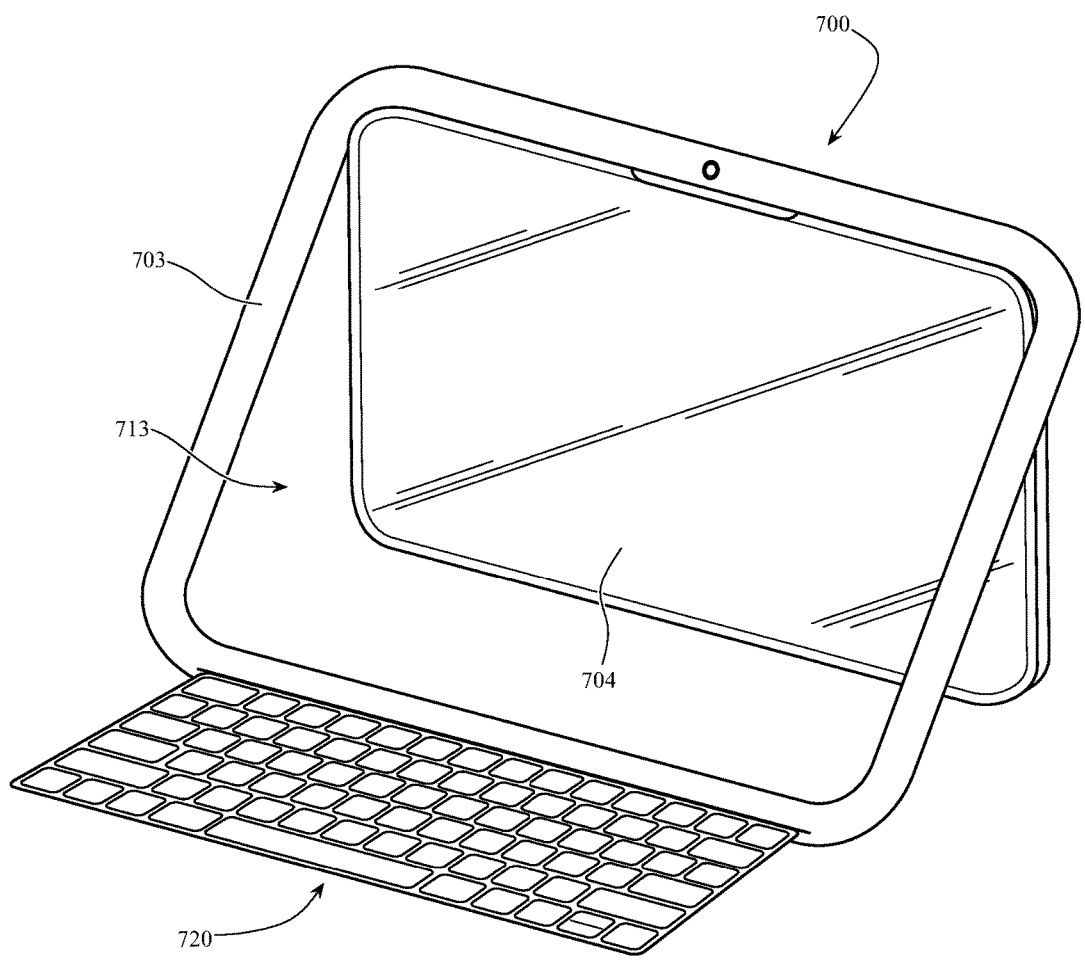
FIG. 17 shows a perspective view of a computing device.

FIG. 16 illustrates a perspective view of a computing device 600 including a removable input device or component. The computing device 600 can be substantially similar to the computing devices 100, 200, 300, 400, and 500 discussed herein and can include a peripheral housing 603 that defines an aperture 613 and a display 604 positioned in the aperture 613 and attached to the peripheral housing 603. The device 600, for example the peripheral housing 603, can additionally include one or more components 620 that can be removably attached thereto. The component or components 620 can be, for example, an input component that can wirelessly transmit or communicate input from a user to the computing device 600. In some embodiments, the input component 620 can be a remote control, a stylus, a wand, or the like. The input component 620 can include any combination of buttons, motion sensors, cameras, or other input modalities to receive input from the user. The input component 620 can be stored or contained entirely within the constant cross-sectional area defined by the peripheral housing 603 when not in use.

In some examples, the component 620 can enhance or enable a variety of features or functionalities of the device 600. Further, in some examples, multiple components 620 can be swapped in and out of the device 600, as desired by a user, to achieve a certain functionality or feature. For example, in some cases, the component 620 can include an antenna, such as an antenna configured to receive and transmit over a wireless protocol. In some cases, the component 620 can, for example, receive and transmit signals via Wi-Fi. Thus, if a user desired the device 600 to have the capability of using Wi-Fi, the user can remove an existing component, for example the input component 620, from the device 600, and can insert or attach a component 620 having a different functionality, such as the ability to communicate via Wi-Fi. In some cases, the component 620 can include one or more components that enable the device 600 to communicate or receive signals via Wi-Fi, Bluetooth, LTE, and other wireless communication protocols.

Further, the input component 620 may not need to be removed from the device 600 in order to receive inputs from a user. In some cases, the component 620 can, for example, be rigidly fixed to the peripheral housing 603 but can rotate with respect to other portions of the peripheral housing 603 to receive input from a user. In this example, the user can rotate the component 620 with respect to other portions of the peripheral housing 603, for example, to scroll through content on the display 604. The component 620, or other portions of the peripheral housing 603 can also include touch sensors, such as capacitive touch sensors, to detect a touch by a user. Thus, the user can touch component 620 in order to provide inputs to the device 600. For example, a user can swipe their finger across a surface of the component 620 to scroll through content on the display 604.

FIG. 17 illustrates an example of a computing device 700 that includes an additional or alternative input component. Computing device 700 can be substantially similar to the computing devices 100, 200, 300, 400, 500, and 600 discussed herein and can include a peripheral housing 703 that defines an aperture 713 and a display 704 positioned in the aperture 713 and attached to the peripheral housing 703. In some embodiments, and as shown in FIG. 17, an input component 720 can be partially removable so that at least a portion of the input component 720 can moved outside of the cross-sectional area defined by the peripheral housing 703. In some embodiments, the input component 720 can be, for example, a keyboard or other component configured to receive input from a user. In the example depicted in FIG. 17, the keyboard can be a flexible keyboard and can be retracted or rolled up entirely within the constant cross-sectional area defined by the peripheral housing 703, when not in use.

The structures and features of the computing devices 600 and 700 discussed with respect to FIGS. 16 and 17 can include any desired design or shape to serve any number of functions or provide any number or type of device configurations. The following example computing devices illustrate a variety of different embodiments and designs for the computing devices described herein. Further, the features of the various embodiments described herein can be included and combined with one another in any combination. The computing devices discussed herein can include features that enable the device to assume a variety of configurations, including configurations that are a combination of multiple configurations described herein. The various features and embodiments can be configured to be engaged by a user, as illustrated in FIG. 18.

Figure 18:
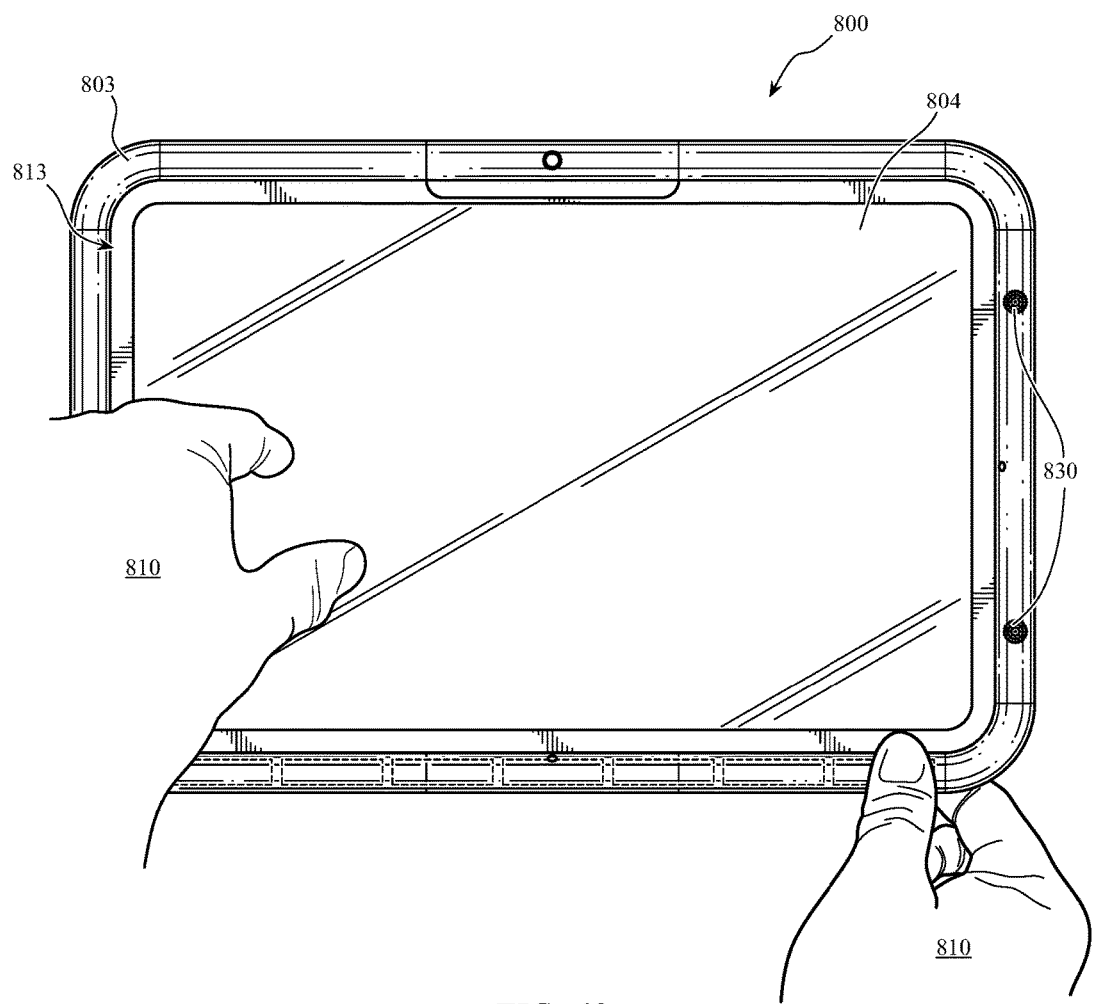
FIG. 18 shows a perspective view of a user interacting with a computing device.

FIG. 18 illustrates an example of a user 810 interacting with a computing device 800. The computing device 800 can be substantially similar to the computing devices 100, 200, 300, 400, 500, 600, and 700 discussed herein, and can include a peripheral housing 803 that defines an aperture 813 and a display 804 positioned in the aperture 813 and attached to the peripheral housing 803. As discussed herein, in some embodiments, the display 804 can be a touchscreen display, such as a capacitive touchscreen display, and a user 810 can interact with the device 800 by touching the display 804 in one or more locations. However, in some embodiments, the display 804 may not be a touchscreen display, and a user's interaction with the display 804 and/or the device 800 can be detected in other ways. For example, in some embodiments where the peripheral housing 803 is proud of a surface of the display 804, one or more components 830 that can detect a user's touch or a position of a user's appendage 810 can be housed or positioned within the constant cross-sectional area of the peripheral housing 803. For example, in some embodiments, an infrared transmitter and/or camera can be contained entirely within the constant cross-sectional area of the peripheral housing 803 and can detect the position of a user 810 when the user touches the display 804 or otherwise interacts with the device 800. In some embodiments, the peripheral housing 803 can include one or more apertures, holes, openings, ports, or other features to allow the components housed therein to be properly oriented and function as desired. Interaction with the display 804 can be accomplished in multiple ways, including those illustrated in FIG. 19.

Figure 19:
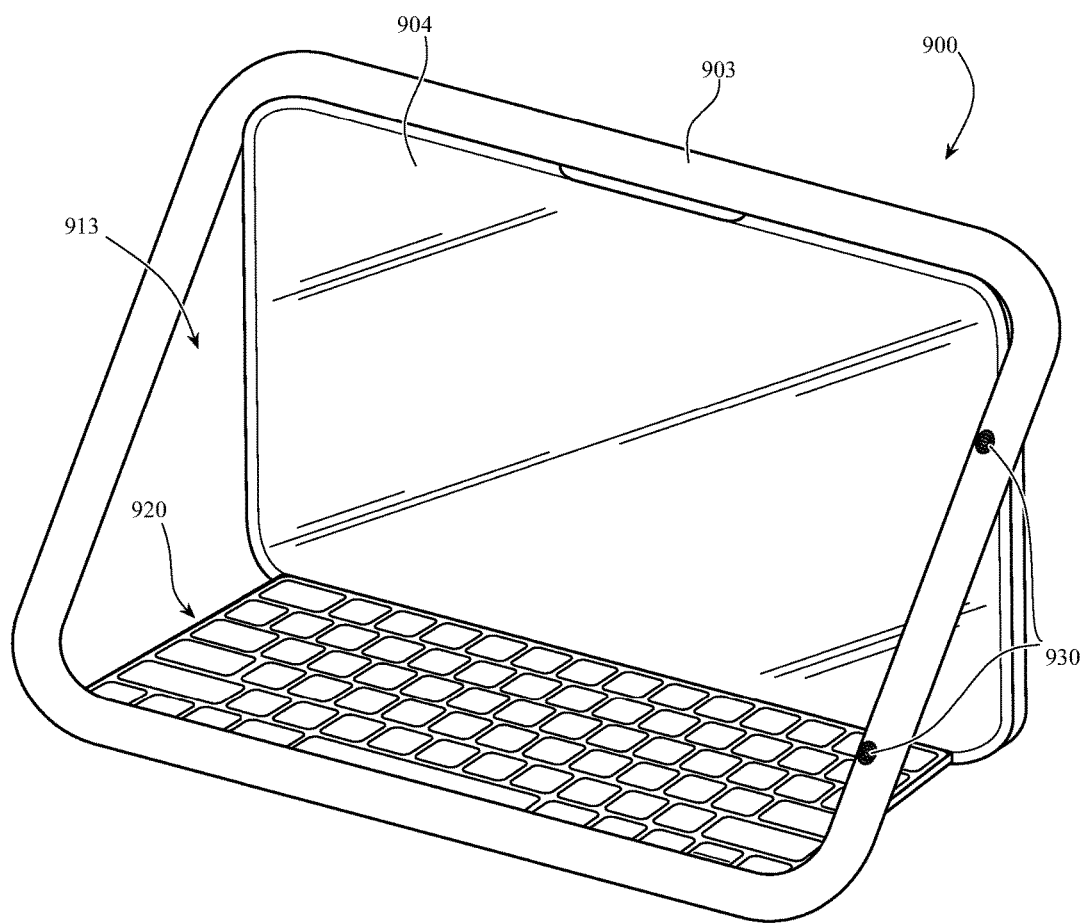
FIG. 19 shows a perspective view of a computing device.

In some embodiments, and as shown in FIG. 19, the components and functionalities described at least with respect to computing devices 600, 700, and 800 can be included in a computing device 900. The computing device 900 can be substantially similar to the computing devices 100, 200, 300, 400, 500, 600, 700, and 800 discussed herein and can include a peripheral housing 903 that defines an aperture 913 and a display 904 positioned in the aperture 913 and attached to the peripheral housing 903. Computing device 900 can include an at least partially removable input component 920, for example, a keyboard 920 that can be retracted into the cross-sectional area defined by the peripheral housing 903. The peripheral housing 903 can also include a component that can detect a position of a user when an appendage of the user is positioned within or near the aperture 913 defined by the peripheral housing. The computing device 900 can be arranged such that the display 904 is positioned behind the peripheral housing 903 and the user can place their hands through the peripheral housing 903 to interact with the input component 920. Thus, in addition to receiving input from the user via the input component 920, the computing device can also receive input from the user, for example, in the form of hand gestures that can be detected by one or more components positioned within the peripheral housing 903.

By way of example, this arrangement of the computing device 900 can allow a user to type text via the keyboard 920 to be shown on the display 904. However, if the user makes a typo, or wants to move a portion of the text with respect to other portions, the user can make a swiping or pinching gesture while their hand is within the aperture 913. One or more components 930 housed within the constant cross-sectional area of the peripheral housing 903, such as an infrared camera and/or transmitter, can detect the user's gesture for processing by the computing device 900 to achieve the desired result. Additional features can be incorporated into the peripheral housing 903 and display 904, as shown in FIGS. 20 and 21, and as described below.

Figure 20:
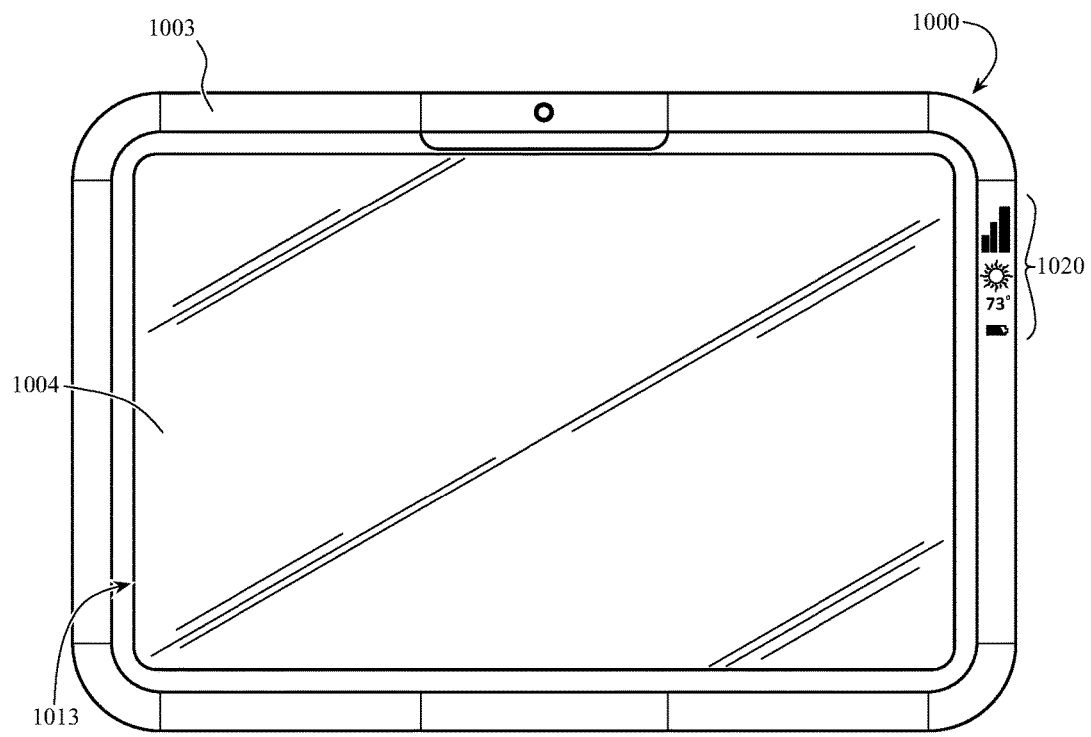
FIG. 20 shows a front view of a computing device.

FIG. 20 shows a front view of a computing device 1000. The computing device 1000 can be substantially similar to the computing devices 100, 200, 300, 400, 500, 600, 700, 800, and 900 discussed herein and can include a peripheral housing 1003 that defines an aperture 1013 and a display 1004 positioned in the aperture 1013 and attached to the peripheral housing 1003. The peripheral housing 1003 can also include a portion 1020 other than the display 1004 that can provide visual content or information to a user. The portion 1020 can include, for example, a display contained entirely within the constant cross-sectional area defined by the peripheral housing 1003. In some embodiments, the portion 1020 can include one or more LEDs and can, in some embodiments, be an LED display. The portion 1020 can display any visual content as desired by a user, such as a battery level, a level of signal strength, weather information, and the like. In some embodiments, the portion 1020 can display visual content to the user even when the display 1004 is not currently displaying visual content.

Figure 21:
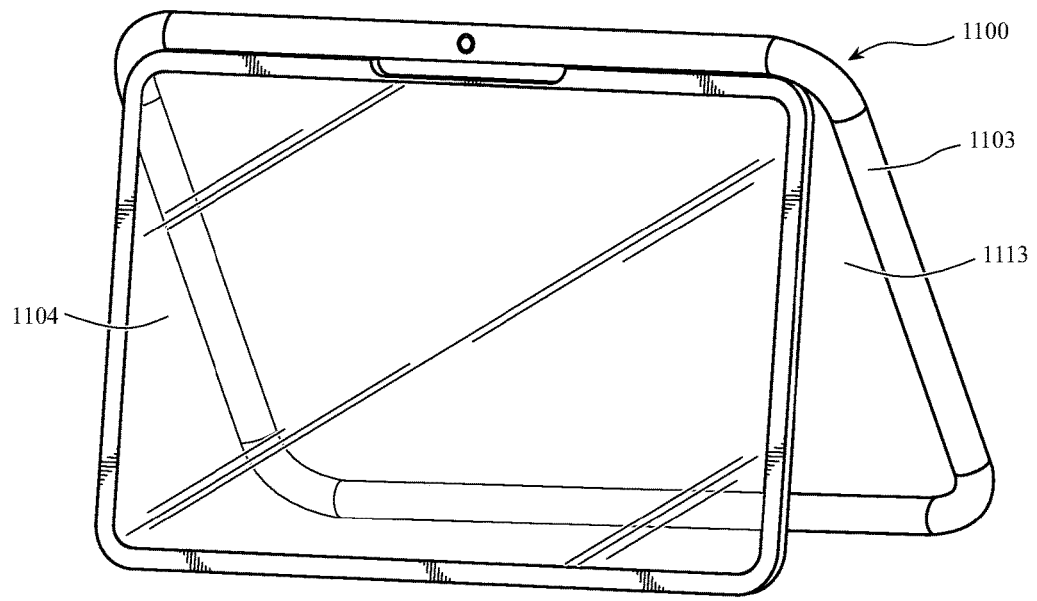
FIG. 21 shows a perspective view of a computing device.

FIG. 21 shows a perspective view of a computing device 1100. The computing device 1100 can be substantially similar to the computing devices 100, 200, 300, 400, 500, 600, 700, 800, 900, and 1000 discussed herein and can include a peripheral housing 1103 that defines an aperture 1113 and a display 1104 positioned in the aperture 1113 and attached to the peripheral housing 1103. As discussed herein, in some embodiments, the display 1104 can be a selectively transparent display. That is, in some embodiments, the display 1104 can be transparent except in areas that are actively displaying visual content. In some embodiments, the display 1104 can be entirely transparent. Thus, in some embodiments, because both major surfaces of such a display 1104 are not obstructed by other portions of the computing device 1100, a transparent display 1104 can allow a user to effectively see through the computing device 1100 and visualize the environment behind the computing device 1100. Such a transparent display can thus allow for information or visuals to be shown on the display 1104 in a manner that accounts for or interacts with the environment visible through the transparent display 1104.

While the display 1104 can be substantially transparent in some cases, in other cases, a transparent effect can be achieved with a substantially non-transparent display 1104. For example, the device 1100 can include one or more cameras disposed at various locations in the peripheral housing 1103. The image information gathered from the cameras, along with rotational and positional information detected by other components of the device 110, can be used to provide visual content to the display that substantially mimics a transparent display. Thus, the display 1104 can display the environment located behind the device 1100.

Additionally, the device 1100 can overlay additional visual content over the displayed content to provide an augmented reality (AR) experience. In some examples, the processor causes the display 1104 to display composite images that include an overlay of select content on top of an image of the environment around the device 1100, as collected by a camera or cameras positioned about the periphery of the housing 1103. This allows the display 1104 to function as an AR display. During use, the cameras within the peripheral housing 1103 provide content to the processor to allow the system to produce the effect of a substantially transparent display 1104, while additional visual content can be added or overlaid on the generated image, by the processor, to interact with the environment depicted on the display 1104. Further, a user can interact with the content on the display overlaying the environment, for example, by the methods and components detailed herein. Alternatively, or additionally, the display 1104 can be reflective, as detailed below with reference to FIG. 22.

Figure 22:
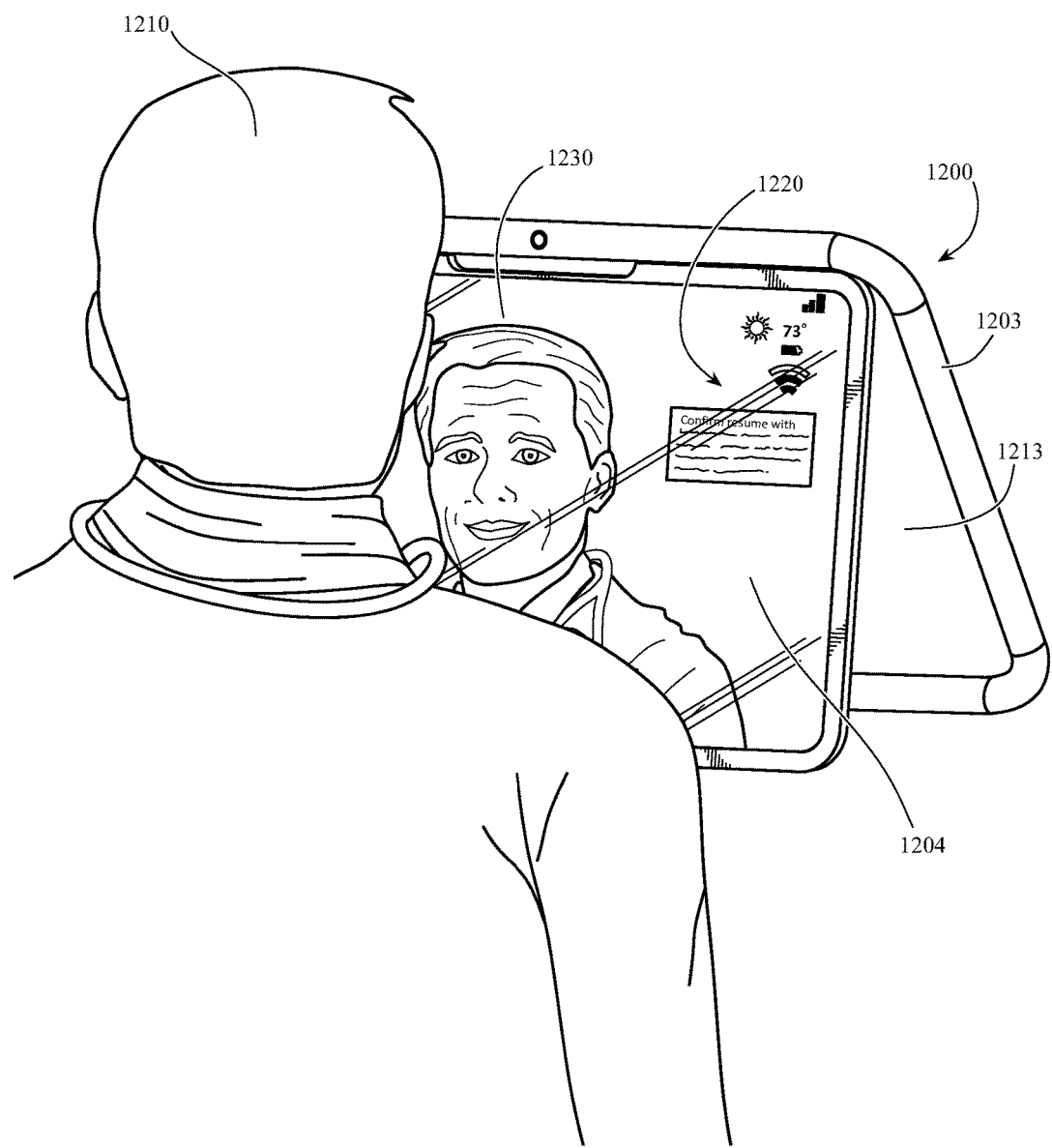
FIG. 22 shows a perspective view of a computing device.

FIG. 22 shows a perspective view of a computing device 1200. The computing device 1200 can be substantially similar to the computing devices 100, 200, 300, 400, 500, 600, 700, 800, 900, 1000, and 1100 discussed herein and can include a peripheral housing 1203 that defines an aperture 1213 and a display 1204 positioned in the aperture 1213 and attached to the peripheral housing 1203. In some other embodiments, and as illustrated in FIG. 22, the display 1204 can be at least partially reflective and can selectively act as a mirror in addition to or in alternative to displaying visual content 1220 to a user 1210. In some embodiments, the display 1204 may be switchable such that the display 1204 acts as a mirror when the computing device 1200 is not in use and can still display visual content to the user 1210 when desired. In some embodiments, the display 1204 can remain mirrored even when displaying visual content. The computing device 1200, including such a mirrored display 1204 can, for example, display visual content to a user 1210 in a manner that accounts for or interacts with a user's reflection 1230 in the display 1204.

In some cases, the device 1200 can detect when a user is viewing the display 1204, for example via a front-facing camera within the peripheral housing 1203. Furthermore, in some examples, the device 1200 can detect the identity of the user viewing the display 1204. The device 1200 can then perform a desired function or functions when it determines that a known user is viewing the display 1204. For example, each of a variety of users can have a separate profile saved to the device 1200, and when the device 1200 detects the identity of a user viewing the display 1204, visual content corresponding to that specific user's profile can be shown on the display 1204. Other visual content or settings can also be displayed or adjusted based on the detected user. In some examples, the device 1200 can be in a locked state with limited functionality until a specific user or users are detected as viewing the display. When the specific user or users are detected, the device 1200 can be unlocked and display user profile dictated content. Such a device 1200 can thus use Face ID technology to unlock the device 1200 or to perform a variety of user specific functions.

Any of the features or aspects of the computing devices discussed herein can be combined or included in any combination. For example, a computing device can include a peripheral housing and a display attached thereto. The peripheral housing can define an aperture of any shape and a display can be disposed therein. The display can be movably or rotatably attached to one or more locations of the peripheral housing, and the peripheral housing can include one or more portions that are movable relative to the display or other portions of the peripheral housing. Further, the components of the computing devices described herein, including components that can be fully or partially removable, can be housed entirely within an internal volume defined by the peripheral housing.

As described above, one aspect of the present technology is the gathering and use of data available from various sources to detect which user is viewing a display of the device and display a profile or other personalized content in response. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content or enable personalized settings of a device. Accordingly, use of such personal information data enables users to have a personalized experience with the device. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of multiple user specific profiles, the present technology can be configured to allow users to select to "opt in" or "opt out" of participation in the collection of personal information data during registration for services or anytime thereafter In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, certain system settings can selectively be enabled or disabled based on non-personal information data or a bare minimum amount of personal information, such as the content being requested by the device associated with a user, other non-personal information available to the device, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A computing device, comprising:
   a peripheral housing defining a through-aperture and an internal housing volume;
   a display disposed within the through-aperture and moveably attached to the peripheral housing; and
   a battery, a processor, and memory disposed entirely within the internal housing volume.

2. The computing device of claim 1, wherein the through-aperture has a shape defined by the peripheral housing and the display has a peripheral shape corresponding to the shape of the through-aperture.

3. The computing device of claim 1, wherein the peripheral housing has a substantially constant cross-section.

4. The computing device of claim 1, wherein:
   the display has a first major surface and a second major surface opposing the first major surface;
   the display is rotatably attached to the peripheral housing; and
   the peripheral housing is proud of the display.

5. The computing device of claim 4, wherein:
   the peripheral housing and the display together define a carrying handle; and
   the peripheral housing physically supports the computing device on a surface when the display is rotated relative to the peripheral housing.

6. The computing device of claim 1, wherein the display is rotatably and selectively attached to the peripheral housing on a first surface and a second surface of the display.

7. The computing device of claim 1, wherein the cross-sectional shape of the peripheral housing is substantially circular.

8. The computing device of claim 1, further comprising an input component removably connected to the peripheral housing.

9. The computing device of claim 1, wherein a portion of an exterior surface of the peripheral housing includes a second display.

10. The computing device of claim 1, wherein a surface of the display is substantially transparent or reflective.

11. A computing device, comprising:
- a peripheral housing defining through-aperture, the peripheral housing further defining an internal housing volume extending substantially around the through-aperture;
- the computing device having computing components, the computing components being disposed exclusively within the internal housing volume; and
- a display disposed within the through-aperture and attached to the peripheral housing.

12. The computing device of claim 11, wherein:
- the display has a first major surface and a second major surface opposing the first major surface, the first major surface defining a front surface of the device and the second major surface defining a rear surface of the device;
- the display is moveably attached to the peripheral housing; and
- the peripheral housing is proud of the display.

13. The computing device of claim 11, wherein a first portion of the peripheral housing is rotatably attached to a second portion of the peripheral housing such that the first portion can rotate out of a plane of the peripheral housing.

14. The computing device of claim 11, wherein a portion of the peripheral housing having a first length is adjustable to a second length.

15. The computing device of claim 11, further comprising an input component removably positioned entirely within the peripheral housing such that at least a portion of the input component can be retracted from the peripheral housing.

16. A computing device, comprising:
- a peripheral housing defining a through-aperture and an internal housing volume extending substantially around the through-aperture;
- a display disposed within the through-aperture and attached to the peripheral housing having a first major surface and a second major surface opposing the first major surface;
- the display being at a location such that the peripheral housing is proud of the display;
- the first major surface defining a front exterior surface of the device;
- the second major surface defining a rear exterior surface of the device; and
- a battery, a processor, and memory disposed within the internal housing volume.

17. The computing device of claim 16, wherein the display is reflective or substantially transparent.

18. The computing device of claim 16, wherein:
- the peripheral housing includes an input component to receive an input from a user and to communicate the input to a processor of the computing device; and
- the input component is removably positioned entirely within the internal volume defined by the peripheral housing.

19. The computing device of claim 16, wherein:
- the peripheral housing defines a top exterior surface of the device, a bottom exterior surface of the device, a left exterior surface of the device, and a right exterior surface of the device; and
- the peripheral shape of the display and the shape of the through-aperture are substantially rectangular.

\* \* \* \* \*